United States Patent [19]
Dent et al.

[11] Patent Number: 5,812,955
[45] Date of Patent: *Sep. 22, 1998

[54] BASE STATION WHICH RELAYS CELLULAR VERIFICATION SIGNALS VIA A TELEPHONE WIRE NETWORK TO VERIFY A CELLULAR RADIO TELEPHONE

[75] Inventors: Paul Wilkinson Dent, Stehag; Jacobus Cornelius Haartsen, Staffanstorp, both of Sweden

[73] Assignee: Ericsson Inc., Research Triangle Park, N.C.

[ * ] Notice: The term of this patent shall not extend beyond the expiration date of Pat. No. 5,428,668.

[21] Appl. No.: 205,705

[22] Filed: Mar. 3, 1994

Related U.S. Application Data

[63] Continuation-in-part of Ser. No. 148,828, Nov. 4, 1993, Pat. No. 5,428,668.

[51] Int. Cl.⁶ ...................................................... H04Q 7/30
[52] U.S. Cl. .............................................. 455/561; 380/37
[58] Field of Search .................................. 379/58, 59, 60, 379/61, 62, 63; 455/33.1, 33.2, 54.1, 11.1, 14, 461, 414, 445, 436, 561; 380/21

[56] References Cited

U.S. PATENT DOCUMENTS

| | | |
|---|---|---|
| 4,953,198 | 8/1990 | Daly et al. . |
| 4,979,205 | 12/1990 | Haraguchi ................................. 379/61 |
| 4,989,230 | 1/1991 | Gillig et al. . |
| 5,034,993 | 7/1991 | Sasuta et al. .......................... 379/63 X |
| 5,091,942 | 2/1992 | Dent ...................................... 379/59 X |
| 5,127,042 | 6/1992 | Gillig et al. . |
| 5,260,988 | 11/1993 | Schellinger et al. ...................... 379/59 |
| 5,353,352 | 10/1994 | Dent et al. ................................ 380/37 |
| 5,513,245 | 4/1996 | Mizikovsky et al. ..................... 379/59 |
| 5,521,962 | 5/1996 | Chavez, Jr. ............................... 379/60 |
| 5,521,963 | 5/1996 | Shrader et al. ............................ 379/60 |
| 5,526,402 | 6/1996 | Dent et al. ................................ 379/59 |
| 5,535,259 | 7/1996 | Dent et al. ................................ 379/59 |
| 5,581,597 | 12/1996 | Dent et al. ................................ 379/59 |
| 5,623,531 | 4/1997 | Nilssen ..................................... 379/56 |

FOREIGN PATENT DOCUMENTS

| | | |
|---|---|---|
| 0 225 607 | 6/1987 | European Pat. Off. . |
| 0643 543 A2 | 3/1995 | European Pat. Off. . |
| 5-48526 | 2/1993 | Japan . |

OTHER PUBLICATIONS

*Microcellular Structures and Their Performance*, H. Persson, IEEE, 1992, pp. 413–418.
*NTT to Market Cordless Telephone for Office Buildings*, Comline Telecommunications, p. 4, Jun. 29, 1988.
*SW Bell Mobile Plans PCS*, A. Lindstrom, Communications Week, No. 448, p. 6(1), Apr. 5, 1993.

(List continued on next page.)

*Primary Examiner*—William Cumming
*Attorney, Agent, or Firm*—Myers Bigel Sibley & Sajovec

[57] ABSTRACT

A secure radio personal communication system and method includes a base station which relays cellular verification signals between a wide area cellular network and a cellular terminal via the wire telephone network. Thus, cellular telephone calls which are routed to a cellular terminal via a base station, when the cellular terminal is within a local region covered by the base station, may be exchanged between the cellular network and cellular terminal over the wire telephone network. Calls from the wide area cellular network which are routed through the base station can thus employ the same security systems and methods which are employed by the wide area cellular network. Signals between the base station and the cellular terminal are preferably exchanged when the cellular terminal is parked in the base station. Verification and encryption signals may be exchanged. The same signals may be used for enhanced security when the base station is relaying wire network calls to the cellular terminal when the cellular terminal is in the local region. Alternatively, separate verification and encryption protocols may be used.

41 Claims, 12 Drawing Sheets

OTHER PUBLICATIONS

*Bell Atlantic and Motorola To Test Personal Communications Service,* Warren Publishing, Inc., Audio Week, vol. 4, No. 7, Feb. 17, 1992.

*RHCS Stake Claim on Personal Communications Licenses,* Capitol Publications, Inc., FCC Week, vol. 7, No. 42, Nov. 5, 1990.

*Aermica's First Personal Communications Service (PCS) Is Claimed,* Audio Week, Apr. 5, 1993.

*Nation's First Commercial PCS Introduced by SW Bell,* E. Messner, Network World, vol. 10, Issue 14, p. 4(2), Apr. 5, 1993.

*Mitsubishi Electric To Enter Radio Base Station Market For Digital Cellular Phones,* Mitsubishi Weekly, vol. 9, No. 9, Mar. 5, 1993, Digitized Information, Inc.

*Wireless System Manufacturers Develop Microcell Equipment,* Phillips Business Information, Inc., PCS News, vol. 4, No. 6, Mar. 18, 1993.

*Cox Moves Ahead On Alternate Access, PCS,* G. Kim, Multichannel News, vol. 12, No. 35, p. 33(1), Sep. 2, 1991.

*New Service Moves Toward National Information Infrastructure Via PCS,* Common Carrier Week, vol. 8, No. 7, p. 5(2), Feb. 17, 1992.

*In Search Of A New Market,* R. Schneiderman, Microwaves & RF, vol. 30, No. 8, p. 33(5), Aug. 1991.

*Motorola Blurs Lines Between Cellular and Paging,* Dealerscope Merchandising, vol. 35, No. 7, pp. 36, Jul. 1993.

*Mitsubishi Electric to Enter Radio Base Station Market for Digital Cellular Phones,* Comline Telecommunications, p. 9, Mar. 5, 1993.

*Expected to Show Reference Design at COMDEX: Motor Sampling PCS Chip Set,* Electronic Engineering Times, p. 1, Oct. 26, 1992.

*Bell Atlantic and Motorola to Test Personal Communications Service,* Audio Week, Feb. 17, 1992.

*New Service Moves Toward National Information Infrastructure Via PCS,* Common Carrier Week, Feb. 17, 1992.

M. Brussol, et al., Telepoint in France, *Matra Communication,* vol. 15, pp. 21–30, 1993.

Walker, Security in Mobile and Cordless Telecommunications, *IEEE,* pp. 493–496, 1992.

BASE STATION WHICH RELAYS CELLULAR VERIFICATION SIGNALS VIA A TELEPHONE WIRE NETWORK TO VERIFY A CELLULAR RADIO TELEPHONE

CROSS-REFERENCE TO RELATED APPLICATIONS

This application is a Continuation-in-Part of application Ser. No. 08/148,828 filed on Nov. 4, 1993, now U.S. Pat. No. 5,428,668, and assigned to the assignee of the present invention, the disclosure of which is incorporated herein by reference.

FIELD OF THE INVENTION

This invention relates to communications systems and more particularly to radio personal communications systems for use within wide area cellular networks.

BACKGROUND OF THE INVENTION

Radio communications systems are increasingly being used for wireless mobile communications. An example of a radio communications system is a cellular phone network. Cellular radio communications systems are wide area communications networks which utilize a frequency (channel) reuse pattern. The design and operation of an analog cellular phone system is described in an article entitled *Advanced Mobile Phone Service* by Blecher, IEEE Transactions on Vehicular Technology, Vol. VT29, No. 2, May, 1980, pp. 238–244. The analog mobile cellular system is also referred to as the "AMPS" system.

Recently, digital cellular phone systems have also been proposed and implemented using a Time-Division Multiple Access (TDMA) architecture. Standards have also been set by the Electronics Industries Association (EIA) and the Telecommunications Industries Association (TIA) for an American Digital Cellular (ADC) architecture which is a dual mode analog and digital system following EIA/TIA document IS-54B. Telephones which implement the IS-54B dual mode architecture are presently being marketed by the assignee of the present invention. Different standards have been promulgated for digital cellular phone systems in Europe. The European digital cellular system, also referred to as GSM, also uses a TDMA architecture.

Proposals have recently been made to expand the cellular phone network into a radio personal communications system. The radio personal communications system provides mobile radio voice, digital, video and/or multimedia communications using radio personal communications terminals. Thus, any form of information may be sent and received. Radio personal communications terminals include a radio telephone, such as a cellular telephone, and may include other components for voice, digital, video and/or multimedia communications.

A radio personal communications system includes at least one telephone base station, also referred to herein as a "base station". A base station is a low power transceiver which communicates with a radio personal communications terminal such as a cellular telephone over a limited distance, such as tens of meters, and is also electrically connected to the conventional public wire telephone network. The base station allows the owner of a radio personal communications terminal to directly access the wire telephone network without passing through the cellular phone network, whose access rates are typically more costly. When located outside the range of the base station, the personal communications terminal automatically communicates with the cellular phone network at the prevailing access rates.

A major problem in implementing a radio personal communications system is security for communications between the base station and the personal communications terminal. Modern cellular telephone networks include security systems and methods to prevent eavesdropping and telephone fraud. Eavesdropping may be prevented by using encryption of radio transmissions between a cellular phone and a cellular network. Fraud may be prevented by preventing radio telephone transmissions between the cellular phone and the cellular network unless identification information is successfully exchanged between the cellular phone and the cellular network. Existing cellular systems, such as the AMPS system, the ADC system, and the GSM system each include their own security systems and methods. Security should not be compromised by communications between the radio personal communications terminal and the base station of a radio personal communications system.

SUMMARY OF THE INVENTION

It is therefore an object of the present invention to provide an improved radio personal communications system including a base station and a radio personal communications terminal, and methods for using the same.

It is another object of the present invention to provide radio personal communications systems which do not compromise security of a wide area cellular system with which they interact.

In the present invention, a base station connects a wire telephone network to a radio personal communications terminal, also referred to herein as a "cellular terminal" or simply a "terminal", within a local region of a wide area cellular network. The base station includes a wire telephone network connector, for connecting the base station to the wire telephone network. The base station relays cellular verification signals between the wide area cellular network and a cellular terminal via the wire telephone network connector. Thus, wireless telephone calls which are routed to the cellular terminal via the base station, when the cellular terminal is within the local region covered by the base station, may be secured by exchange of data between the cellular network and cellular terminal over the wire telephone network via the wire telephone connector and the base station. Calls from the public switched telephone network including the wide area cellular network which are routed through the base station can thus employ the same security systems and methods which are employed by the wide area cellular network.

In a preferred embodiment, the telephone base station includes a coupler which is adapted for cooperatively mating with a cellular terminal which is parked in the base station. The coupler couples the cellular security information between the cellular terminal and the base station. Cellular security information can include encryption keys that are relayed from the wide area cellular network to the cellular terminal via the wire telephone connector for use in encrypting communications with the base station.

Enhanced security is provided by relaying the security information between the cellular terminal and the base station when the cellular terminal is parked in the base station, to avoid their radio frequency transmission. Exchanged security information can also include authentication signals that bilaterally verify both the identity of the cellular phone to the cellular network and the identity of the network to the phone, as described in U.S. patent application Ser. No. 08/043,758 and U.S. Pat. No. 5,091,942, the disclosure of both of which are hereby incorporated herein by reference.

As an alternative to physically mating the terminal with the base however, signals may be relayed between the cellular terminal and the cellular network, via the base station and the wire network connector, by using radio frequency transmission over cellular frequencies, between the cellular terminal and the base station. This radio frequency transmission may be necessary when verification and encryption signals are exchanged upon reactivation of the base station, when the cellular terminal moves outside the local region and then returns to the local region. Telephone communication between the terminal and the public switched network via the base station is prevented unless the relayed cellular verification signals indicate that the radio telephone communication is authorized.

The base station and the cellular terminal may also exchange local verification information, separate from the cellular verification information, for communications between the base station and terminal when the terminal is within the local region and is receiving communications via the wire telephone network connector from the wire telephone network. Thus, the wide area cellular network need not be contacted in order to provide security for local communications between the cellular terminal and the base station within local region for calls originating from the wire telephone network.

It will be understood by those having skill in the art that the local authentication procedure preferably uses the same protocol as the cellular telephone verification procedure. The local authentication key is preferably exchanged when the cellular terminal is parked in the base station, via the coupler, but may also be established by exchanging radio frequency transmissions. Local encryption keys may also be established along with local authentication keys. Telephone communication between the terminal and the wire telephone network via the wire telephone network connector on a subsequent occasion is prevented unless the exchanged local authentication signals are consistent with the previously established authentication information.

The above described security systems serve two primary purposes. First they prevent an unauthorized cellular terminal from making calls via a base station for which someone else will be billed. Second, they prevent eavesdropping, which is otherwise easy when communications are transferred from the hardwired medium to the radio medium.

Eavesdropping may be prevented by the use of digital voice transmission using digital encryption. Digital encryption typically requires the use of a secret quantity or "key" known only to the cellular terminal and the base station with which it is communicating. One function of the security system is thus to establish this common key.

It is more secure to establish the key for encryption of conversations separately for each call, instead of using the same key forever, although the exposure risk in using the same key for several calls is small. Such temporary keys can be formed by combining a secret key with a random number upon call set up.

The secret key or A-key is preferably stored in both the cellular terminal and the base station or network in a non-accessible manner. At call set up, the base station transmits a random number RAND to the cellular terminal. The cellular terminal combines RAND and A-key to obtain a temporary key "B-key" and the base station does the same. The B-key is then used for encrypting further communication between the two units until it is overwritten by a subsequent exchange. If the transfer of the number to be called is part of the encrypted further communications, an unauthorized cellular terminal, that is unable to generate the correct B-key because it does not have access to the A-key, will not be able to continue and set up a call, thus preventing useful unauthorized access.

The above description shows that appropriate encryption may also inherently prevent fraud. An alternative technique of denying unauthorized access may also be used, called "authentication". In authentication, a random number RAND is transmitted from the base station to the cellular terminal as described above. The RAND is in this case known as an authentication challenge. The cellular terminal combines RAND with A-key to obtain a response RESP to the challenge, and transmits RESP to the base station. The base station also locally computes RESP and checks the received version against its locally computed version. If they do not match, access is denied.

Authentication alone however does not guarantee that access will be denied to a fraudulent cellular terminal. For example, one could construct a false base station that issues many random challenges to a genuine cellular terminal in its vicinity and records the corresponding responses, increasing the probability of having in its memory a challenge-response pair that the real base station will accept. Even worse, it can initiate a call to the real base station, wait for the real base station to issue a challenge, then temporarily shut off its transmitter just as the genuine cellular terminal replies with RESP. When the real base station indicates it has accepted the call, the fraudulent base station starts up its transmitter again at a sufficient power level to overpower the genuine cellular terminal, and can then proceed to set up a call.

Encryption can be used to prevent these fraudulent practices, and can be used in combination with the authentication techniques described above. Encryption security depends on preventing access to the long-term secret A-key. This can be done by providing a device, such as an integrated circuit chip, that includes the A-key embedded in electronic form, an authentication algorithm processor, an electrical input for RAND and an electrical output for RESP and/or B-key.

The chip preferably provides no access to read out the A-key, and performs only one operation, namely to respond to a challenge with RAND by returning RESP and B-key. The internal processor buss that must be able to access the internally stored A-key is not accessible external to the chip and can even be prevented from access under a microscope and microprobe system by covering the chip with a metallic screening layer. Such a device is employed in the European GSM cellular system and is known as a "smart card". In one form it is supplied to subscribers by their service providers in a thin, plug-in card like a credit-card.

The A-key of every subscriber for such a security system is stored in a secure computer somewhere in the cellular system. Information on a particular subscriber is stored in the network in his Home Location Register (HLR) which is part of a cellular exchange belonging to the service provider with whom he has a subscription. When a subscriber uses his cellular terminal to access a visited network (VLR), the cellular terminal first transmits its telephone number to the VLR. The VLR can identify that subscriber's HLR from the telephone number and contacts the HLR via a telephone trunk signalling system known as signalling system no. 7 in Europe, or via a system called IS41 in the U.S. The VLR then requests security variables from the HLR that can be used to verify the mobile's claimed identity and/or to encrypt the conversation, that is a RAND/RESP pair and a B-key. To reduce use of the trunk lines, several RAND/RESP/B-key triplets can be sent by the HLR to the VLR in the same transaction, sufficient perhaps for a day's use at the visited location.

Another threat to the security of such a system is the possibility of unauthorized access to signalling system no. 7 or IS41 lines, which connect all telephone exchanges together, even those in different countries and continents. An unauthorized request to an HLR for security variables pertaining to particular telephone number can then be made. If the VLR were permitted to specify RAND, a previously used RAND could be specified and then the fraudulent VLR would receive a B-key that had the recorded call to be deciphered. Therefore, the VLR should not be allowed to specify the RAND, but rather it should be generated extemporaneously by the HLR. However, the fraudulent VLR would still receive a valid security triplet. This may not be useful for making fraudulent calls, as the real VLR would again contact the HLR and would receive new triplets not possessed by the fraudulent VLR. Nevertheless, it is preferable to prevent a fraudulent VLR from receiving any security information pertaining to any subscriber. This can be prevented if the HLR first issues only the RAND to the VLR, the VLR transmits it to the cellular terminal, the cellular terminal replies with RESP and the VLR conveys RESP to the HLR. Only if the HLR confirms the identity of the cellular terminal would it then release a B-key and possibly further triplets.

The above described technique may still allow a false VLR to extract RAND/RESP pairs from genuine cellular terminals in the hope of collecting sufficient pairs to provide a high probability of being able to make a fraudulent access to the real system. This is prevented by introducing the bilateral authentication procedure described in the aforementioned patent application and U.S. patent that were above incorporated by reference. In a preferred implementation of bilateral authentication, the cellular terminal first identifies itself to the VLR. The VLR determines the cellular terminal's HLR from the ID and contacts the HLR for security variables. The HLR extemporaneously issues a random challenge RAND and computes the B-key and two responses, RESP1 and RESP2 by combining RAND with the identified subscriber's A-key. The HLR releases the RAND and the first response RESP1 only to the VLR. The VLR transmits RAND and RESP1 to the cellular terminal. The cellular terminal combines RAND with its stored A-key and also generates RESP1, RESP2 and B-key, and compares the generated RESP1 with the received RESP1. If they match, then it can confirm that the VLR has been in contact with the genuine HLR. It then sends RESP2 to the authenticated VLR. The VLR sends RESP2 to the HLR and the HLR compares its generated RESP2 with the received RESP2. If they match, this confirms to the HLR that the VLR is in contact with the genuine cellular terminal. The HLR then releases the B-key to the VLR for encrypted communication with the cellular terminal, and possible further sets of RAND, RESP1, RESP2 and B-key, now called security quadruplets.

Thus, a preferred embodiment of the present invention implements the above described security features in the base station. It is desirable that the station not contain the highly secret A-key known only to the cellular terminal and its HLR. However, this may be allowed if the key is supplied in secure "smart card" form to the base station as well as to the cellular terminal. However, an alternative is described below.

If the station is not to contain permanent security information, it must, like the VLR, obtain such information from the HLR. Since the base station is connected to the PSTN via the normal wireline telephone interface, it can ring up the HLR, for example using a special 800 service number, and request security quadruplets. Since that service number can be rung by any PSTN subscriber, it is even more important to protect against fraudulent requests for security information than for the more obscure "fraudulent VLR" threat. Therefore the HLR releases first only the extemporaneously generated RAND, waits for the base station to convey it to the cellular terminal and receive the reply RESP, and then will only release a B-key to the microbase if the correct RESP is relayed to it. The base and the cellular terminal respectively then use the B-key to encipher communications between them for a predetermined time or amount of calls thereafter. The base station can, like the HLR, receive a bundle of quadruplets that can be used for a period such as a day or for a defined number of calls before contact with the HLR is again required for new security variables. Alternatively, user option can trigger the base station to seek new variables, with use of the previous set being cycled randomly from call to call until the user decides to renew the set. In this way, the secret A-key is never required to be stored in the base station nor are security quadruplets stored that could be useful in obtaining unauthorized cellular access or in deciphering cellular calls.

Moreover, the base station can be arranged to erase all stored quadruplets upon both loss of power and loss of the telephone connection. Exchange of security information with the wide area cellular network via the public switched telephone network and exchange of security information between the base station and cellular terminal, would then be initialized or reinitialized upon detection of connection or reconnection of the wire telephone network connector to the wire telephone network and/or to the power supply outlet. Thus, new security variables are reestablished after the base station has been moved. The relaying of verification and encryption signals, by the base station to the wide area cellular network via the wire telephone network, preferably takes place each time the cellular terminal returns from outside the local region back to the local region, but the frequency with which this is done is optional. This operation, referred to as "reactivation", ensures that the proper cellular terminal is operating with the base station.

Preferably, the cellular verification signals include a temporary key which is provided by the cellular network and which is stored in the base station as part of the verification exchange between the cellular network and the cellular terminal via the base station. This temporary key is preferably used for all communications between the cellular terminal and the base station while the cellular terminal is within the local region, whether or not these communications originate from the wide area cellular network (via the wire telephone network), or from the wire telephone network.

Once the cellular terminal moves outside the local region, the temporary key may be erased from the base station so that a new temporary key must be obtained from the wide area cellular network via the wire telephone network upon reentry into the local region. Alternatively, this can be a user option as discussed above. The use of a temporary key can allow multiple calls to take place within the local region using a single temporary key. Long term security is not affected, however, because a new temporary key can be obtained at any time. Moreover, long term security is not impacted because the permanent key of the cellular telephone is not stored in the base station. Secure radio personal communication system and methods are thereby provided.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
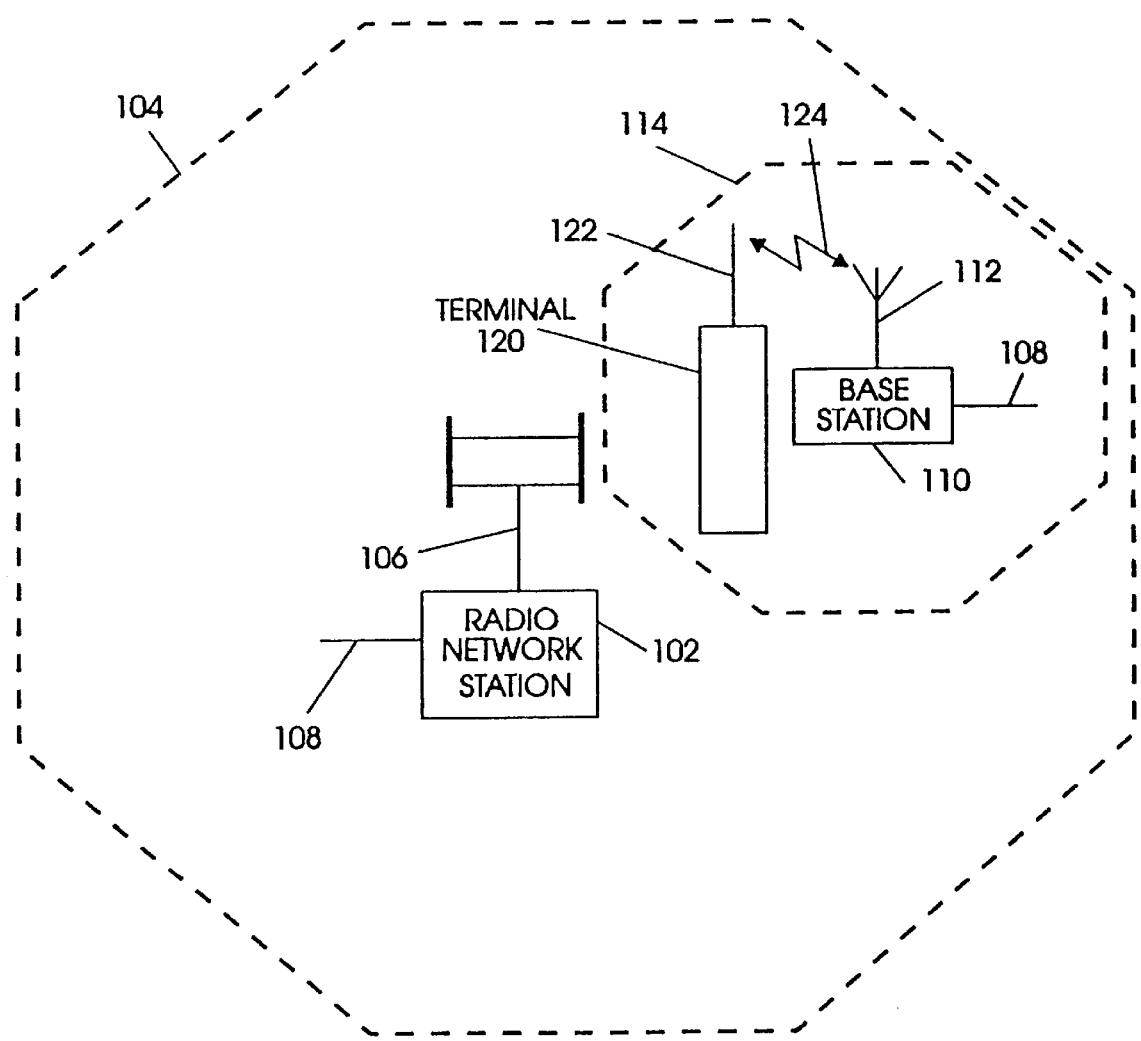
FIGS. 1A and 1B schematically illustrate a radio personal communications system including a base station and a cellular terminal, with radio communications between the terminal and the base station, and alternatively radio communications between the terminal and a wide area cellular network, respectively.
Figure 1B:
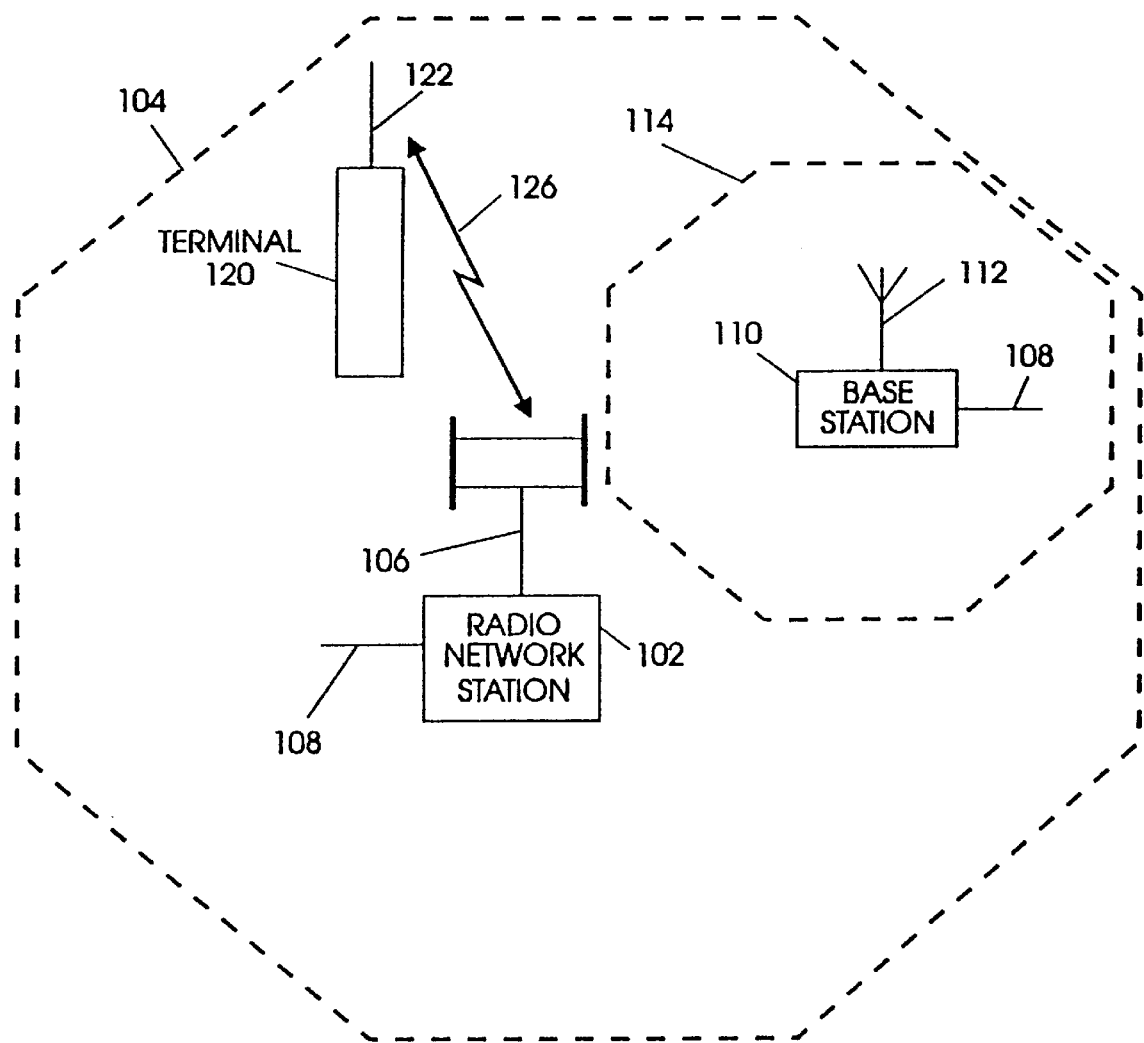
Figure 7:
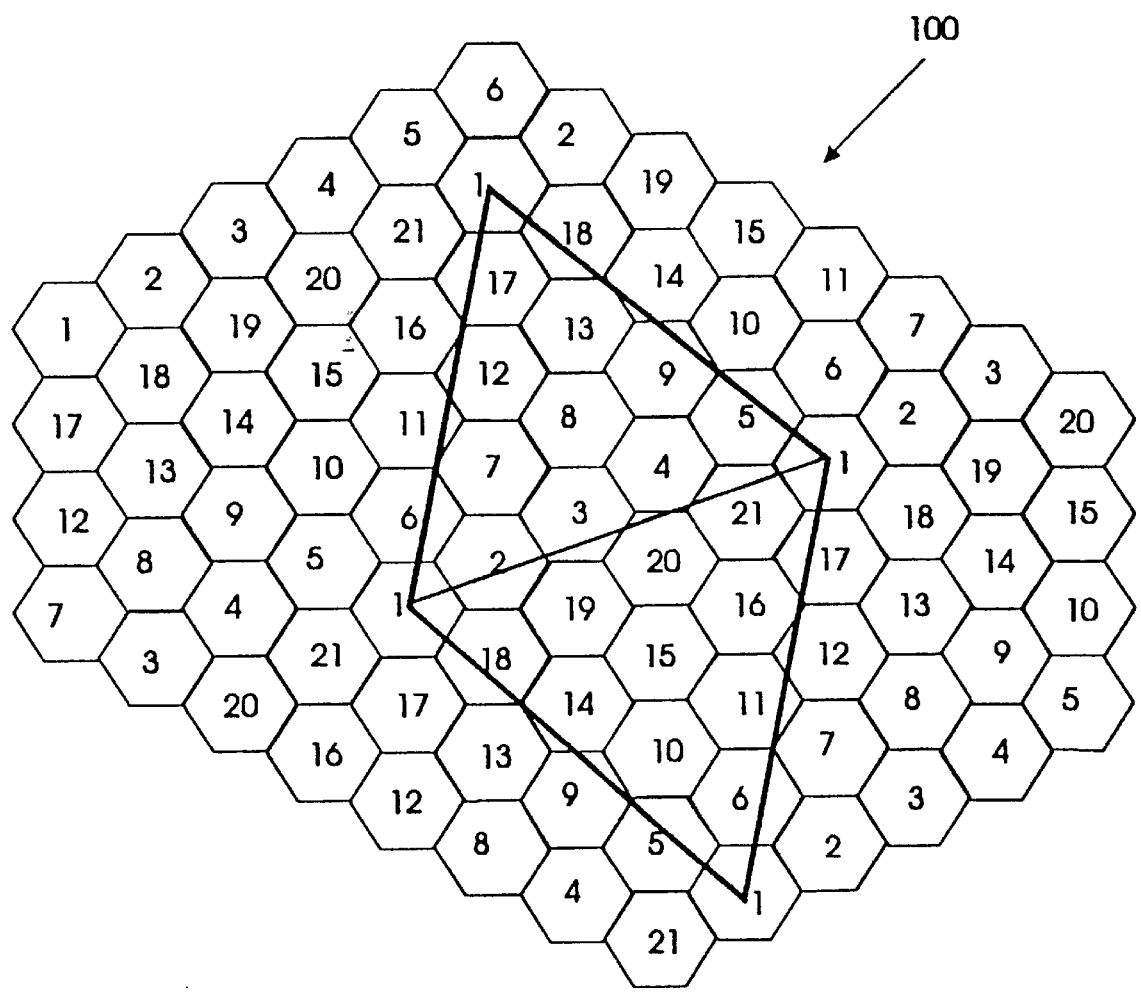
FIG. 7 is a schematic illustration of a first cell re-use pattern for a wide area cellular network.
Figure 8:
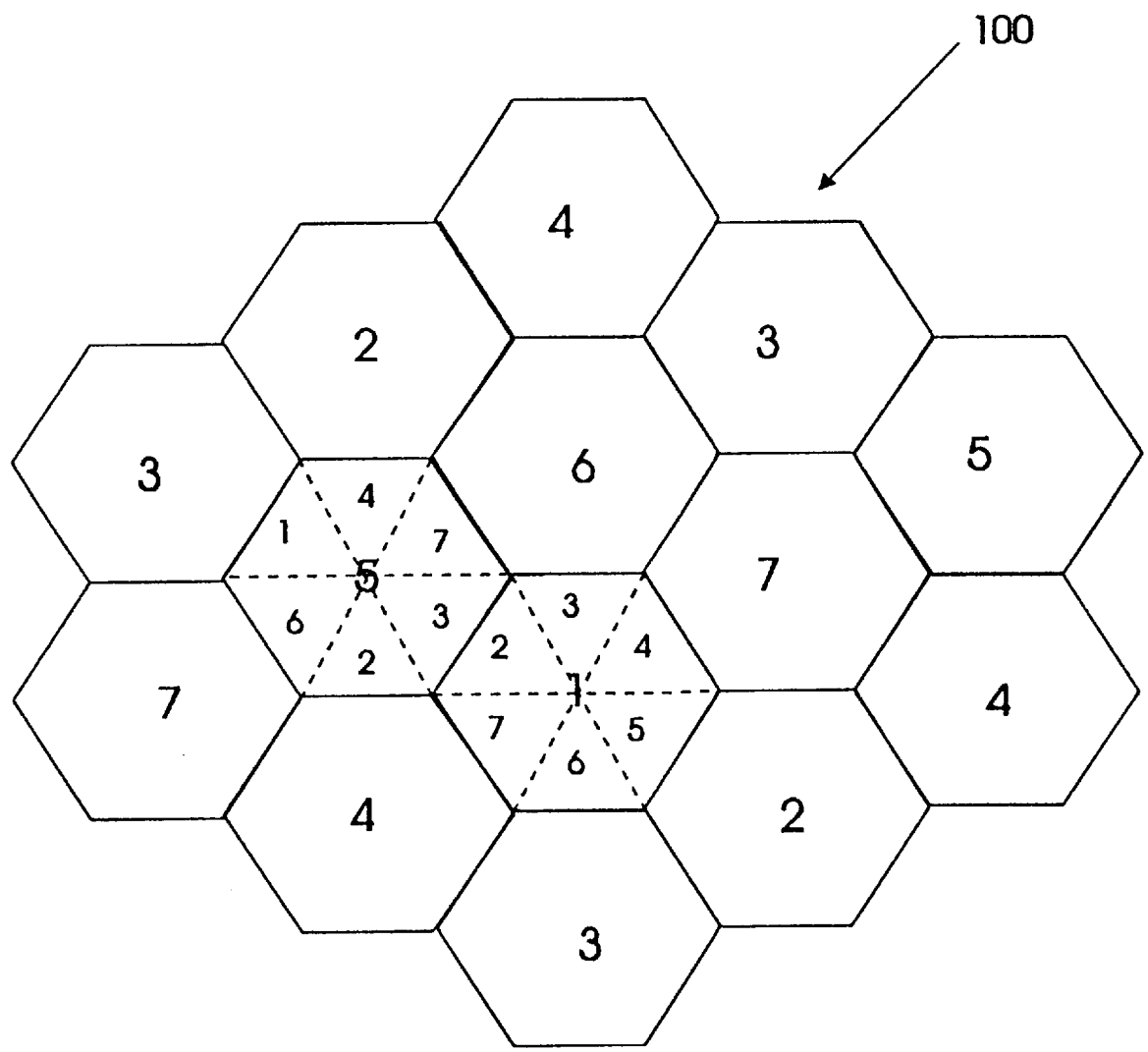
FIG. 8 is a schematic illustration of a second cell re-use pattern for a wide area cellular network illustrating a method of allocating base station frequency according to the present invention.

Referring now to FIGS. 1A and 1B, conceptual diagrams of a radio personal communications system according to the present invention are shown. Such a system operates within a cellular communications network which allocates portions of a plurality of frequencies (channels) within a spectrum to separate geographic cells. Thus, the system provides a wide area wireless communications network having the capacity to provide high quality wireless communications to a large number of users with a limited number of frequencies allocated to the wide area cellular network. As shown in FIG. 1A, a wide area cellular network includes at least one radio network cell station 102, such as a cellular telephone cell station, for transmitting and receiving messages in a network cell range indicated by 104, via cell antenna 106. The range 104 of radio network cell station 102 is typically represented graphically as illustrated in FIGS. 1A, 1B, 7 and 8. Radio network cell station 102 also interfaces with the wire network 108 in special trunk and signalling lines. It will be understood by those having skill in the art that a wide area cellular network 100 typically includes many radio network cell stations 102 to cover a large area as illustrated in FIGS. 7 and 8. In such a system each radio network cell station 102 covers a cell (range) 104 within wide area cellular network 100 and may be connected to a Mobile Switching Center (MSC), which is a special form of telephone exchange for mobile phones, via special landlines or microwave (wireless) links. The MSC is in turn connected to the PSTN 108 via special trunk and signalling lines to provide connectivity between any radio network cell station 102 of cellular network 100 and the outside world.

Still referring to FIG. 1A, a telephone base station 110 is located within the cell (range) 104 of a network cell station 102 of wide area cellular network 100. Base station 110 includes a low power transceiver for transmitting and receiving via base station antenna 112, over a limited base station range 114, typically on the order of tens of meters. Thus, a base station may be used for transmission and receipt of radio personal communications in a home or office. Base station 110 also is electrically connected to the wire network 108, for example by a normal telephone jack socket. Wire network 108, is also referred to as the Public Switched Telephone Network (PSTN). PSTN 108 is the regular "wire line" telephone system supplied by, for example, the regional Bell Operating Companies, and may use copper wire, wireless local loop extensions, wideband cable, optical fiber, or other stationary transmission channels. Base station 110 may be wired directly to PSTN 108 (in a domestic application for example) or connect through a PABX (not shown) in an office environment, for example.

Still referring to FIG. 1A, a radio personal communications terminal 120 is shown for radio communications with either base station 110 or radio network cell station 102 via antenna 122. Radio personal communications terminal 120, also referred to herein as a "cellular terminal" or simply a "terminal", includes a radio telephone such as a cellular phone. Terminal 120 may also include, for example, a full computer keyboard and display, a document scanner, and full graphics and multimedia capabilities.

As illustrated in FIG. 1A, when terminal 120 is in the range 114 of the base station 110, a radio link 124 therebetween is established. As shown in FIG. 1B, when the terminal 120 is outside the range 114 of the base station 110, but within the range (cell) 104 of the network cell station 102, a new radio link 126 is automatically established with the network cell station 102 to establish communications through wide area cellular network 100. Thus, when the user is relatively close to the base station 110 (i.e. within the home or office), wireless communications take place with the base station so that the wide area cellular network, with its higher billing rate structure, is bypassed. When the user is relatively far from the base station 110, communications take place with the cellular network.

It will be understood by those having skill in the art that a complete radio personal communications system will typically include many base stations 110, terminals 120 and radio network cell stations 102. It will also be understood by those having skill in the art that conventional communications and handoff protocols may be used with the present invention, and need not be described further herein. For purposes of this description, it will be assumed that the spectrum allocation for the radio network cells is the IS-54B cellular phone spectrum allocation which is illustrated in Table 1 below.

TABLE 1

| System | Bandwidth (MHz) | Number of Channels | Boundary Channel Number | Transmitter Center Frequency (MHz) MOBILE | Transmitter Center Frequency (MHz) BASE |
|---|---|---|---|---|---|
| Not Used |  | 1 |  | (824.010) | (869.010) |
| A* | 1 | 33 | 991 | 824.040 | 869.040 |
|  |  |  | 1023 | 825.000 | 870.000 |
| A | 10 | 333 | 1 | 825.030 | 870.030 |
|  |  |  | 333 | 834.990 | 879.990 |
| B | 10 | 333 | 334 | 835.020 | 880.020 |
|  |  |  | 666 | 844.980 | 889.980 |
| A' | 1.5 | 50 | 667 | 845.010 | 890.010 |
|  |  |  | 716 | 846.480 | 891.480 |
| B' | 1.5 | 83 | 717 | 846.510 | 891.510 |
|  |  |  | 799 | 848.970 | 893.970 |

| Transmitter | Channel Number | Center Frequency (MHz) |
|---|---|---|
| MOBILE | $1 \leq N \leq 799$ | $0.030 N + 825.000$ |
|  | $990 \leq N \leq 1023$ | $0.030 (N - 1023) + 825.000$ |
| BASE | $1 \leq N \leq 799$ | $0.030 N + 870.000$ |
|  | $990 \leq N \leq 1023$ | $0.030 (N - 1023) + 870.000$ |

In the radio personal communications system described in FIGS. 1A and 1B, it is important to avoid same channel interference between base station 110 and the radio network cell station 102. Same channel interference can be avoided by using two discrete spectra for the network calls and for the base station. For example, the base station can use cordless telephone protocols and frequencies. Unfortunately, this requires the terminal 120 to operate under both cellular and cordless protocols, which may be costly and wasteful.

According to the invention, the operator of network 100, which has typically been assigned the use of a specific plurality of frequencies within a frequency spectrum of a designated geographic region by a regulatory authority, is allowed to assign frequencies and optionally power levels, of base station 110. The wide area cellular network operator (provider) can assign frequencies and optionally power levels to base station 110 to minimize same channel interference and to maximize revenue from the assigned frequency spectrum.

According to the invention, base station 110 uses the obtained frequency and power level, respectively, to govern operation of base station 110. Frequency and power level signals may be obtained at the same time as the aforementioned security information, and may also be used to control operation of the radio personal communications (cellular) terminal 120 as will be described below. As will also be described below cellular terminal 120 may be controlled to operate at the same frequency and power level as base station 110. Alternatively, a different frequency and power level may be provided. Thus, the wide area cellular network operator has the opportunity to receive revenue from the provision of frequencies and security variables, while simultaneously preventing radio communications between base station 110 and terminal 120 from interfering with communications within cellular network 100. Even if the cellular operator declines this revenue in the interest of competition, the enhanced security provided by the present invention environment can help to attract new customers to the cellular operator's network.

Figure 2:
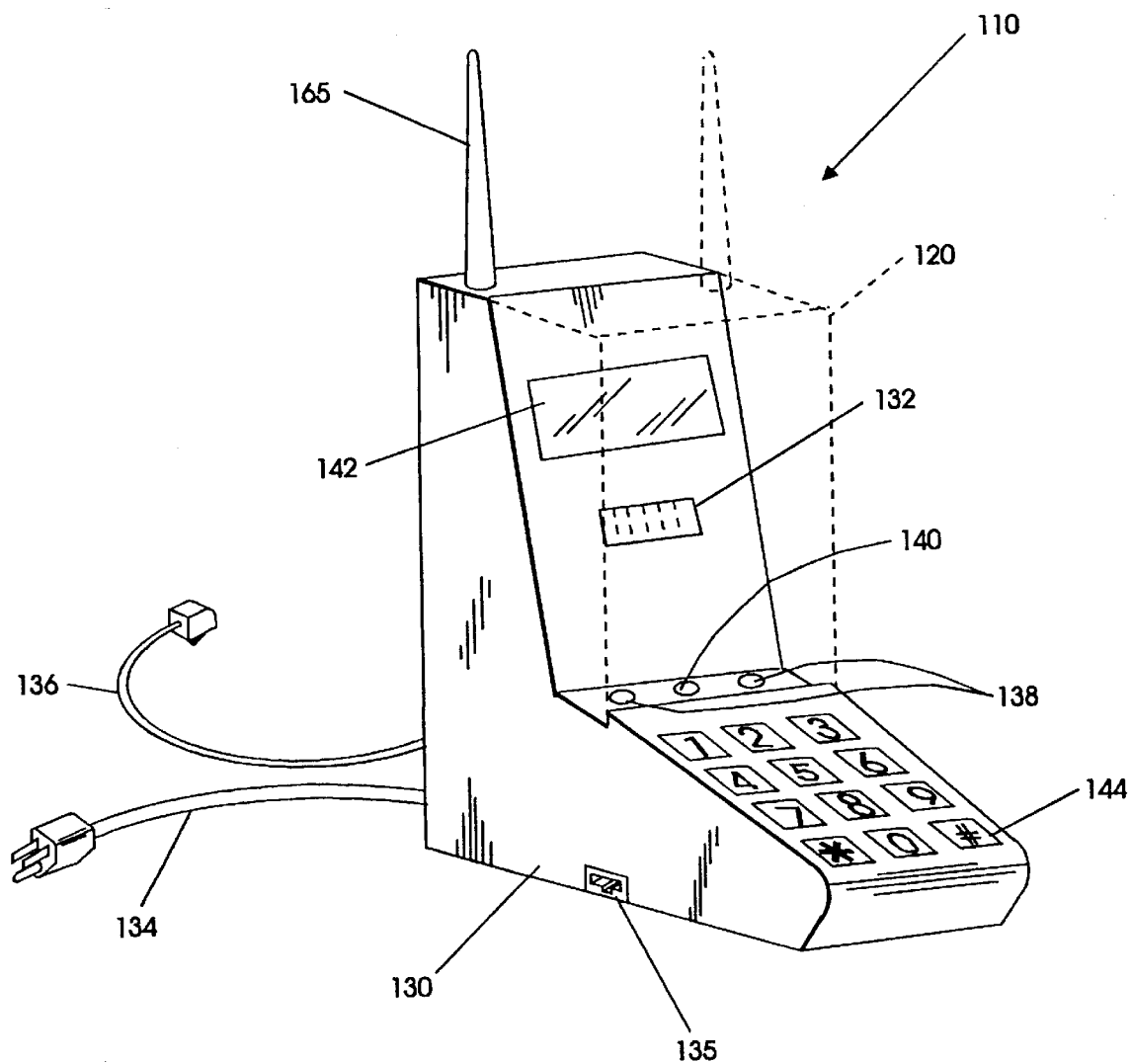
FIG. 2 illustrates a front perspective view of an embodiment of a base station of the present invention, with a terminal shown in hidden lines.

An embodiment of a base station and cellular terminal according to the present invention is illustrated in FIG. 2. Base station 110 includes housing 130 which is adapted to cooperatively mate with cellular terminal 120 and provide an electrical interface between base station 110 and cellular terminal 120 using electrical connector 132 or other electrical connector means. Base station 110 is connected to a power source (power outlet) by power line connector 134 or other power connection means and to a wire telephone network by a wire telephone network connector 136 extending from base station 110 to within housing 130 or other means for electrically connecting base station 110 to a wire telephone network. As shown in FIG. 2, housing 130 is preferably portable to allow the user to move it and reinstall it in different locations. Base station 110 as illustrated in FIG. 2 may further include battery charger connector 138 or other charger interface means which connects battery powered cellular terminal 120 to a battery charger (not shown in FIG. 2) when cellular terminal 120 is inserted or parked in housing 130 as illustrated by hidden lines in FIG. 2. Sensor 140 detects when cellular terminal 120 is parked in housing 130 and the battery charger is activated to charge the battery of battery powered cellular terminal 120. It will be understood by those having skill in the art that a separate sensor 140 need not be used to detect when terminal 120 is parked in housing 130.

Base station 110 as illustrated in FIG. 2 can also include display 142 or other user indicating means. Alternatively, cellular terminal 120 may include an indicating means which may be used to display signals from base station 110 transmitted over electrical connector 132 when cellular terminal 120 is parked in housing 130. Base station 110 may also include keyboard 144 or other user input means. Alternatively, as with display 142, cellular terminal 120 may include an input means which may be used to provide inputs to base station 110 when cellular terminal 120 is parked in housing 130. Optionally, the base station 110 can include an interface 135 with the normal domestic wire line phone which would ring in response to incoming calls only if the cellular terminal was switched off or is otherwise unreachable.

Figure 3:
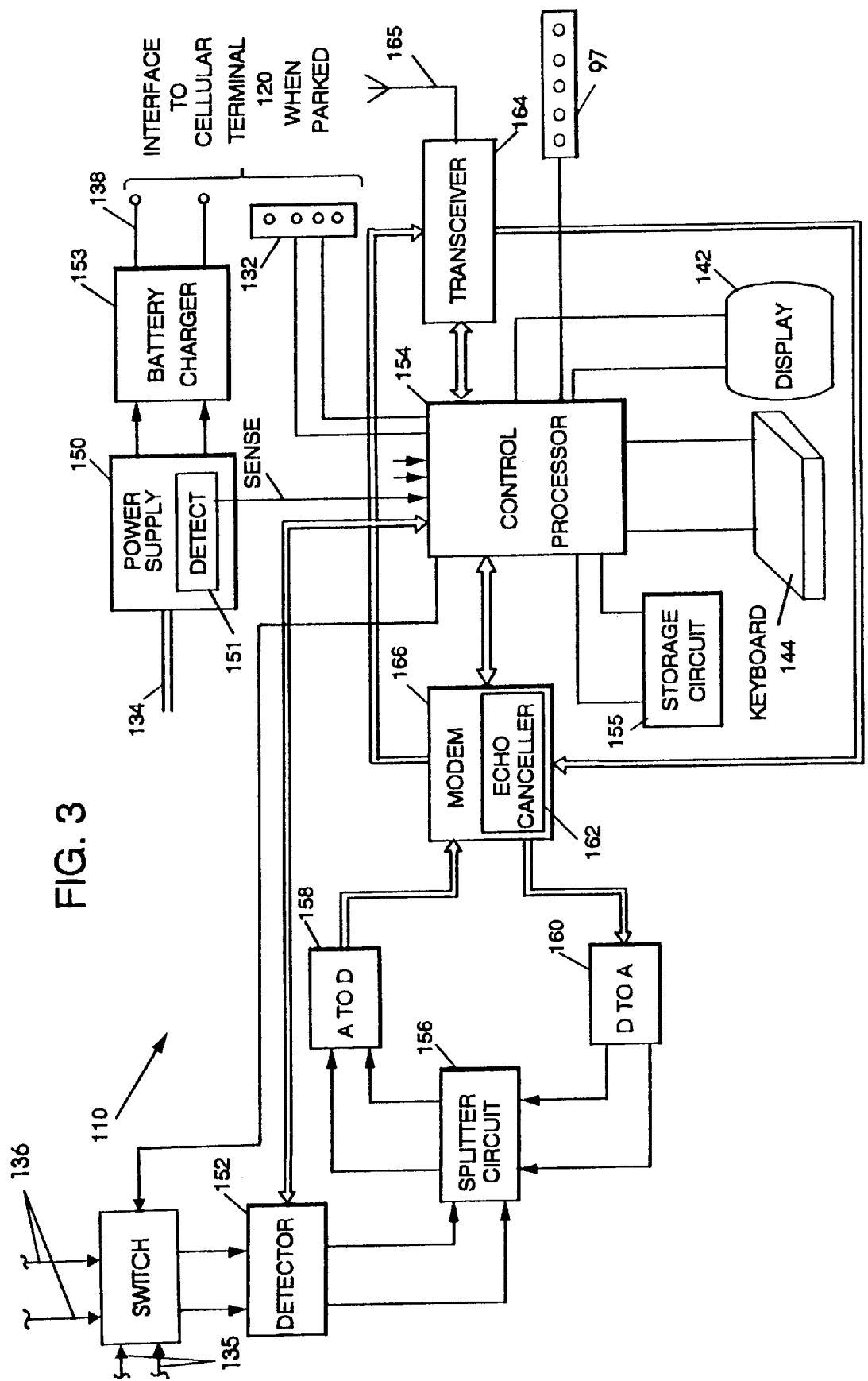
FIG. 3 is a schematic block diagram of a base station according to the present invention.

A block diagram of an embodiment of a base station 110 of the present invention is illustrated in FIG. 3. Power supply 150 is connected to power line connector 134 and provides the power supply voltages to the circuitry of base station 110. Power supply 150 further includes power detection means 151 for detecting when the connection of power line connector 134 to the power source has been lost and for providing a sense signal to control processor 154 indicating that power has been lost.

Ringing current and exchange battery voltage detector 152 is electrically connected to wire telephone connector 136 and includes means for detecting an incoming call on wire telephone connector 136 which is connected to wire telephone network 108. Detector 152 further detects if the electrical connection of wire telephone network 108 to connector 136 has been lost. Detector 152 supplies signals to control processor 154 when an incoming call "ring" is detected and when the connection to wire telephone network 108 is lost. An indication that the wire telephone network (line) connection has been lost may then be sent to display 142 under the control of control processor 154. Control processor 154 can also control switch 98 to connect an incoming call to the normal wire line phone interface or jack 135 when the cellular is unreachable. Alternatively, this connection may serve a fax machine.

Control processor 154, in cooperation with ringing current and exchange battery voltage detector 152 provides activation means for initiating communications between wire telephone network 108 and cellular terminal 120 through base station 110 when cellular terminal 120 is within region 114. For incoming calls from wire telephone network (line) 108, detector 152 detects the incoming call and sends an activation signal to control processor 154 which in turn controls subsequent communications operations of base station 110. For calls initiated from cellular terminal 120, control processor 154 detects the communication from cellular terminal 120 received by transceiver circuit 164 or other radio transceiving means connected to antenna 112 at a selected frequency within the spectrum of wide area cellular network 100. Control processor 154 sends a control signal to detector circuit 152 to generate OFF-HOOK and other signals such as pulse dialling that may be necessary to interface with a loop-disconnect line interface such as is typically used by wire telephone network 108. A smart card interface 97 may also be provided.

Splitter circuit 156 effects a split of the two-wire, bidirectional telephone audio signal into a four-wire system of separate send and receive signals. Received signals from the wire telephone network 108 are converted from analog to digital by analog to digital converter (A to D) 158 while transmit signals to wire telephone network 108 are converted from digital to analog by digital to analog converter (D to A) 160. This allows all of the subsequent audio signal processing to be carried out digitally using digital signal processors. Echo canceler 162 attenuates echoes of the signal sent through connector 136 to PSTN wire network 108 to inhibit corrupting of the signal received from the PSTN. Echo canceler circuit 162 further prevents echoes being transmitted to cellular terminal 120 by transceiver circuit 164 or other radio transceiving means connected to antenna 112.

On incoming calls over wire telephone network (line) connector 136, transceiver circuit 164 responds to the ring detect from detector 152 under the control of processor 154 to communicate with cellular terminal 120 using a selected frequency within the frequency spectrum of the wide area cellular network 100. Storage circuit 155 or other storage means is electrically connected to control processor 154 to provide a storage capacity for program and data information such as a frequency indicating signal representing the selected frequency. Storage circuit 155 may include conventional readable and writable memory such as RAM or EEPROM.

After echo cancellation, modem 166 processes received digitized audio signals to extract any digital control messages that might be received along with the audio signal from the wire telephone network (line). Such digital control messages may for example be programming information for base station 110 transmitted by the operator of wide area cellular network 100. Extracted digital control messages are passed to control processor 154. Modem 166 may perform data/speech discrimination. A digital signal processor such as Texas Instruments type TMS320C56 may be used for echo canceler 162 and modem 166.

Received digitized speech is passed to transceiver 164 for transmission. The digitized speech may first be compressed by compression circuit, not shown, to a lower bit rate using a conventional speech decoding algorithm such as CELP or VSELP. In an analog transmission embodiment of base station 110 of the present invention a conversion circuit, not shown, reconverts the discriminated speech to an analog signal for modulating transceiver 164 which in this embodiment is an analog transceiver.

Radio signals from cellular terminal 120 to base station 110 received by antenna 112 are detected and converted to digital speech signals by transceiver 164. The digital speech signals are then passed to echo canceler circuit 162 and modem circuit 166 for transmission on wire telephone network (line) connector 136 to wire network 108. Alternatively, the received signals may be digitized to complex number form, using for example the LOGPOLAR technique described in U.S. Pat. No. 5,048,049. The complex number stream is then passed to modem 166 for numerical demodulation and conversion to analog speech for sending on the wire telephone line.

The present invention may also be used for data transmission from cellular terminal 120 when cellular terminal 120 either incorporates a personal computer system or by plugging cellular terminal 120 into a personal computer to connect the computer to modem circuit 166 without the use of a direct wire telephone line cable connection to the computer. When handling data transmissions, modem circuit 166 and transceiver 164 translate the data stream between the over-the-air protocols used and normal wire telephone line data transmission protocols. Transceiver 164 may also detect when the received signal has reverted to voice and, responsive to control processor 154, effect a reversion of modem circuit 166 and echo canceler circuit 162 to the processing of voice signals.

Transceiver 164 may be selected to generate and receive signals conforming to any standard, for example, AMPS, ETACS, NMT450, NMT900, GSM, DCS1800 or IS54. In addition, transceiver 164 may generate or receive signals conforming to air-interface standard for communications with satellite systems, such as INMARSAT-M, INMARSAT-P, IRIDIUM, ODYSSEY, GLOBALSTAR, ELLIPSAT or M-SAT. All such standards may be utilized with the present invention to provide communications from cellular terminal 120 through normal PSTN wire lines 108 and avoiding using the wide area system.

Figure 4:
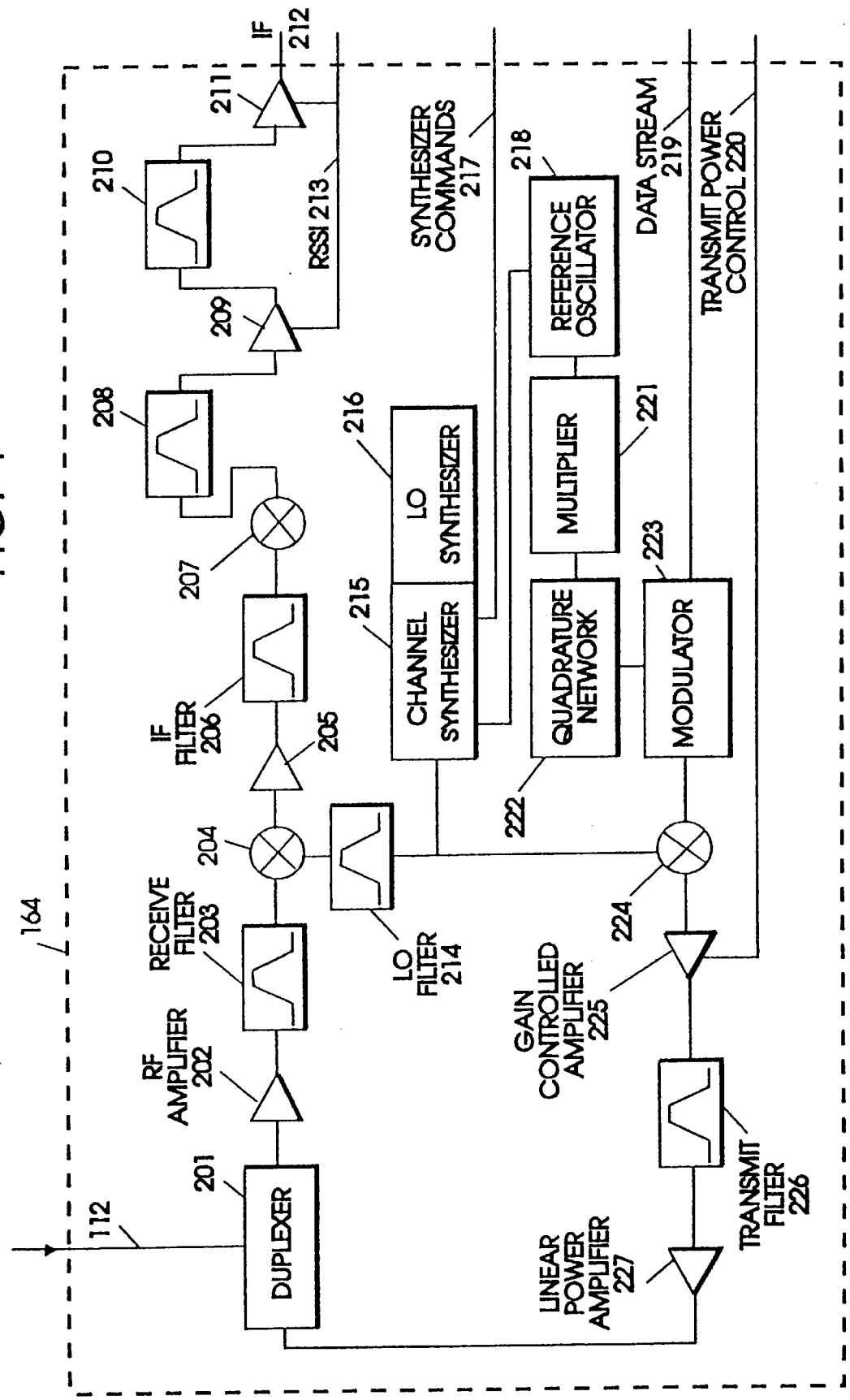
FIG. 4 is a schematic block diagram of a base station transceiver according to the present invention.

FIG. 4 illustrates a schematic block diagram of a radio transceiver 164 of FIG. 3. As shown, transceiver 164 includes circuitry for both the reception and transmission of the radio frequency signals. Signals received by the antenna 112 are directed to the receive circuits by the duplexer 201. The duplexer is a filter with two separate bandpass responses: one for passing signals in the receive band and another for passing signals in the transmit band. Duplexer 201 allows simultaneous transmission and reception of signals by using different receive and transmit frequencies. For example, in the IS54 architecture, the receive and transmit frequencies are separated by 45 MHz.

After passing through the duplexer 201, received signals are amplified by a low noise radio frequency (RF) amplifier 202. This amplifier provides enough gain to overcome the loss of duplexor 201 and filter 203, and to swamp noise of mixer 204. After amplification, unwanted components of the signal are filtered out by the receive filter 203. After filtering, the signal is mixed down to a first intermediate frequency (IF) by mixing it in mixer 204 with a second signal generated by the channel synthesizer 215 and filtered by Local Oscillator (LO) filter 214. The first IF signal is then amplified by amplifier 205 and unwanted mixing products are removed by IF filter 206. After filtering, the first IF is mixed in mixer 207 to yet another lower frequency or second IF signal, using a signal provided by local oscillator synthesizer 216. The second IF signal is then filtered by two filters 208 and 210, and amplified by multistage amplifiers 209 and 211 to obtain an IF signal 212 and a radio signal strength indication (RSSI) signal 213. Thereafter, it undergoes a process of digitization, for example, as described in U.S. Pat. No. 5,048,059 to Dent, the disclosure of which is incorporated herein by reference.

In order to transmit, a datastream 219 is generated by modem 166 (FIG. 3). In IS54 architecture, the datastream is organized as bursts for time division multiplexing with other users. Reference oscillator 218 generates a precise frequency which is used as a stable reference for the RF circuits. The output of oscillator 218 is passed through a multiplier 221 where it experiences a sixfold increase in frequency. This frequency is then passed into a quadrature network 222 which produces two signals of equal amplitude which have a quadrature phase relationship, i.e. they are offset by 90°. These quadrature signals, along with the datastream 219, are combined in the modulator 223 to create a modulated signal, as described in an article entitled I and Q Modulators for Cellular Communications Systems, D. E. Norton et al., Microwave Journal, Vol. 34, No. 10, October 1991, pp. 63–79. The modulated signal is passed to a mixer 224 which translates the signal to radio frequency. The exact radio frequency is determined by the local oscillator signal provided by the channel synthesizer 215. The radio frequency signal is passed through a variable gain controlled amplifier 225. The gain of this amplifier, which is controlled by means of a voltage on transmit power control line 220, determines the eventual output power, since the linear power amplifier 227 has fixed gain. Filtering is performed by transmit filter 226.

Figure 5:
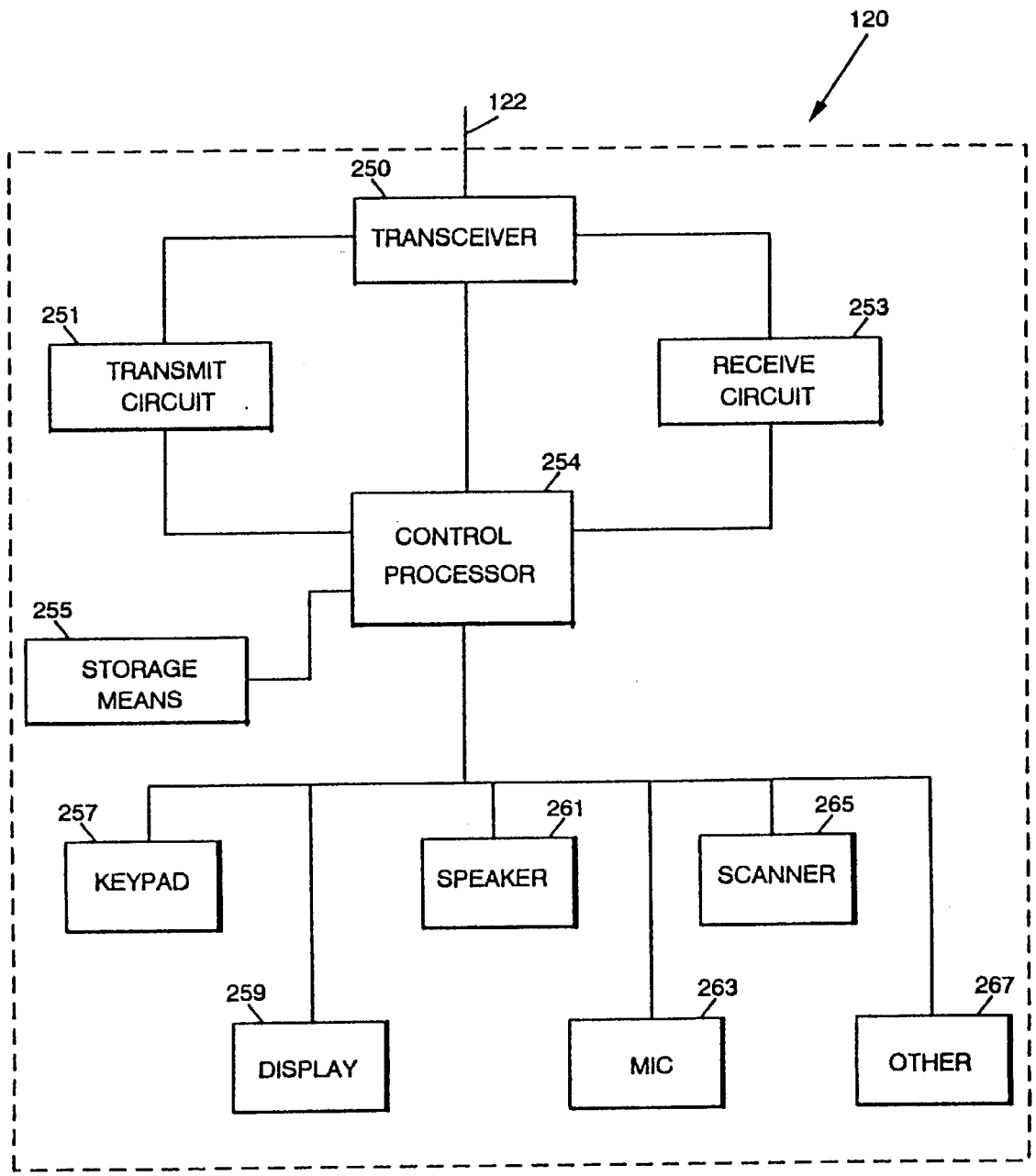
FIG. 5 is a schematic block diagram of a radio personal communications cellular terminal according to the present invention.

Referring now to FIG. 5, the design of terminal 120 is similar to that of base station 110 (FIG. 3) except that a ringing current and exchange battery voltage detector 152 are not present. As illustrated in FIG. 5, cellular terminal 120 includes transceiver 250 or other means for communicating with wide area cellular network 100 when cellular terminal 120 is not within the base region (range) 114 of base station 110 and for communicating with transceiver 164 of base station 110 when cellular terminal 120 is within base region 114. Transceiver 250 is connected to antenna 122. Cellular terminal 120 further includes its own control processor 254 and storage means 255 similar to those described with respect to base station 110 and transmit circuit 251 and receive circuit 253 for receive and transmit signal processing respectively.

As further shown in FIG. 5, when terminal 120 is a cellular phone, it includes a keypad 257, a display 259, a speaker 261, and a microphone 263. In order to provide a computer communications terminal for receipt and transmission of audio, video and data and/or multimedia signals, keypad 257 may be a full scale personal computer keyboard and display 259 may be a large graphics display. A document scanner 265 may also be provided as may other devices 267 such as disk drives and modems. The design of terminal 120 is well known to those having skill in the art and need not be described further herein.

As described above, radio communications between base station 110 and cellular terminal 120 occurs at a frequency assigned by the wide area cellular network provider to avoid same channel interference between base station 110 and network cell station 102. In the embodiment of the present invention described above, the channel selection means which obtains the channel within the cellular spectrum of wide area cellular network 100 for communications between cellular terminal 120 and base station 110 is included in base station 110. For non-multiplexed systems, any given frequency is one channel; however, for multiplexed type systems each frequency may carry multiple communications channels. The present invention will be further described referring to frequency, however, it is to be understood that in a multiplexed system base station 110 may be assigned a specific channel or slot using such selected frequency.

The selected frequency may be entered into base station 110 from external to base station 110 as an extracted digital control message, as described above, in which case the frequency indicating signal is received by base station 110 by wire line communications over connector 136. The frequency indicating signal is converted to a synthesizer command and applied to line 217 to produce the requisite transmit and receive frequency. The power level indicating signal is converted to a transmit power control signal and applied to line 220 to control the transmit power. The conversions are preferably performed by control processor 154 using conventional techniques. Operations performed to set the frequency, and optionally power level, will be described below in connection with FIG. 6.

The frequency indicating signal from the operator of wide area network 100 is selected to minimize interference between base station 110 and network cell station 102. Preferably, a frequency is utilized which is one of the frequencies within the cellular spectrum which is not allocated to the network cell station 102 in the cell 104 in which base station 110 is located. More preferably, a frequency is selected from the group of frequencies within the cellular spectrum which is allocated to a cell of wide area cellular network 100 which is farthest from said base station as illustrated in FIGS. 7 and 8.

The circuitry of base station 110 as illustrated in FIG. 3 further functions as a requesting means within housing 130, electrically connected to wire telephone line connector 136, for communicating with the operator of wide area network 100 over wire network 108 using a predetermined service number stored in storage circuit 155. Control processor 154 initiates a call using the predetermined service number by sending control and a data signals representing a request. Modem 166 and converter 160 are used to transmit the request over line 136 as a known type of carrier which may be detected by a modem (not shown) set up for this purpose by the operator of wide area cellular network 100. The operator of wide area cellular network assigns a frequency manually or automatically, to reduce or avoid frequency interference. The requested frequency indicating signal from the operator of wide area cellular network 100 is then received by modem 166 and an extracted digital control message is provided to control processor 154 as described above. An indication of the selected frequency is stored in storage circuit 155, based upon the received frequency indicating signal. Alternatively, frequencies can be assigned via a removable frequency indicator, such as a "smart card" as described in copending application Ser. No. 08/093,076 to Rydbeck entitled Method and Apparatus for Controlling Transceiver Operations in a Radio Communication System, assigned to the assignee of the present application, the disclosure of which is hereby incorporated herein by reference.

A frequency indicating signal is also provided to cellular terminal 120 when terminal 120 is parked in base station 110 and stored in storage means 255 as an indication of the selected frequency so that both cellular terminal 120 and base station 110 have the selected frequency information. Alternatively, the frequency information may be provided to cellular terminal 120 using the wide area cellular network 100 if cellular terminal 120 is not parked in base station 110 and the user does not wish to park the terminal before initiating communications between base station 110 and cellular terminal 120 following a change in the selected frequency.

The process of requesting a frequency indicating signal may be initiated by the operator as an input using keyboard 144, for example, by pressing #0 to initiate calling the predetermined service number. Alternatively, the request may be initiated by control processor 154 responsive to a lost connection signal from detector 152. The lost connection signal may indicate that the connection of wire telephone line 136 to wire telephone network 108 has been lost or that both the telephone connection and the power connection, based on the signal from power detection means 151 to control processor 154 have been lost, as described above. Thus, the detector 152, power detection means 151 and control processor 154 determine when a new frequency selection is required and initiate such a request.

Alternatively, the selected frequency information may be entered into base station 110 using keyboard 144 which would likewise pass the information to control processor 154. This allows the user of base station 110 to separately obtain the selected frequency information from the operator of wide area cellular network 100 and then manually input the data through keyboard 144.

The means for requesting and receiving the frequency indicating signal may also be contained in cellular terminal 120. If this is the case, cellular terminal 120 may contact the operator of wide area cellular network either through network cell station 102 or using telephone line connector 136 while cellular terminal 120 is parked in base station 110. Likewise, the input means for manually entering the request for a frequency indicating signal may be keypad 257 of cellular terminal 120.

If base station 110 is moved to a new location, any selected frequency previously used may be invalid and likely to cause interference with wide area cellular network 100 if transmissions from base station 110 are allowed to occur without obtaining a new selected frequency from the operator of wide area cellular network 100. It is desirable that base station 110 include means responsive a detected loss of telephone connection or telephone and power connection loss as described above for preventing transmission by transceiver 164 using the previously selected frequency. This may be readily accomplished by the circuitry illustrated in FIG. 3, as control processor 154 receives indicating signals from both detector circuit 152 and power detection means 151 which together act as a means for detecting loss of telephone and/or power connection. Control processor 154 may then control transceiver 164 to prevent further transmissions. Control processor 154 may further send an indication to display 142 indicating that a new frequency needs to be obtained. Control processor 154 may also send a message to the operator of the wide area cellular network via the PSTN network.

Figure 6:
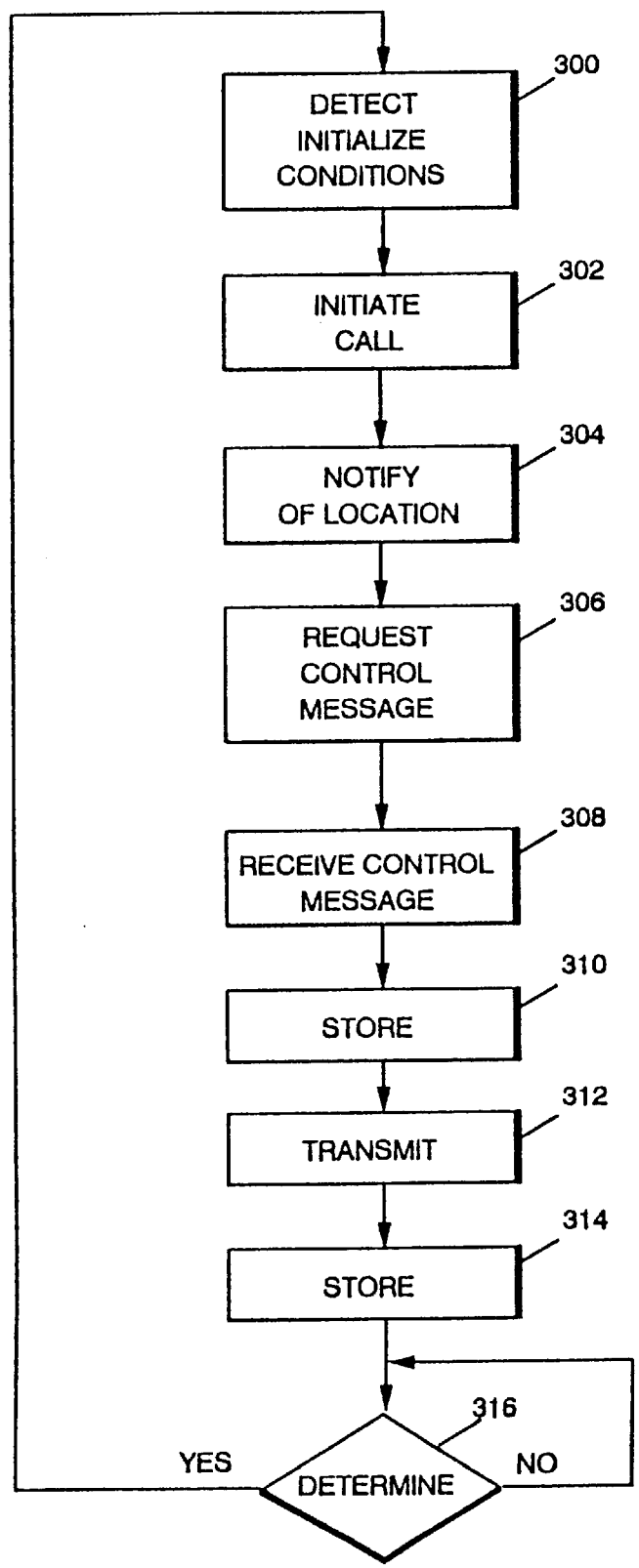
FIG. 6 is a flowchart illustrating operations during initialization of a radio personal communications system according to the present invention.

Initialization and channel acquisition operations of an embodiment of the personal communications system of the present invention are illustrated in the flow chart of FIG. 6. Operations are initialized at block 300 when base station 110 is obtained by the user and plugged into a normal domestic telephone jack with telephone connector 136 and power outlet with power connector 134. On power up, detector 152 notifies control processor 154 that a telephone connection has been established to wire telephone line 108 and power sense signal from power detection means 151 notifies control processor 154 that line power has been connected. At block 302 base station 110 calls the wide area cellular network using a predetermined service number. The service number can be stored in base station 110, requiring only one or two keypad depressions on keyboard 144 to effect dialling or may be initiated automatically as described above. Alternatively, as described above, the user may contact the wide area cellular provider using a different phone and PSTN line and verbally request set-up information which may then be manually keyed into base station 110. The service number can appropriately be an "800" type number that is valid from all locations. According to the invention, set up information is only issued after the aforementioned authentication procedure is successfully completed, thus denying fraudulent use of frequency channels.

After the call is initiated at block 302, base station 110 notifies the wide area cellular network operator of the location of base station 110 at block 304. Using signalling facilities available in modern digital telephone networks, this may be accomplished by having the wide area cellular network operator request from the PSTN the number of the phone line originating the call. At block 306 base station 110 requests a control message including a frequency, from the wide area cellular network operator. The request may also include power level and channel information as well as frequency. At block 308 base station 110 receives a control message including an indication of the requested frequency from the wide area cellular network operator. This is then stored as an indication of the received frequency in base station 110 at block 310.

Base station 110 then transmits an indication of the received frequency to cellular terminal 120 at block 312. This transmission may be accomplished when cellular terminal 120 is parked in base station 110 using system connector 132. Alternatively, a frequency indicating signal may be transmitted by radio communications using transceiver 164 if cellular terminal 120 is not parked in base station 110. Such a transmission may be made using the last frequency assigned to base station 110 by the cellular network operator. Optionally, when it is necessary to reallocate the base frequency when cellular phone 120 is not parked in base station 110, the wide area network operator may place a call to cellular phone 120 over the cellular network and send a data message informing cellular terminal 120 of the change to the base frequency. However, if the base frequency will not be frequently reallocated, base station 110 may notify the user of the need to park cellular terminal 120 to obtain the new frequency information by displaying a warning message on display 142. At block 314 cellular terminal 120 stores an indication of the received frequency in cellular terminal 120.

Once the operating frequency for communications between base station 110 and cellular terminal 120 has initially been established, the assigned frequency will continue to be valid so long as base station 110 remains in the same location. However, should base station 110 be moved to a new location, interference with the wide area cellular network could result as the previously assigned frequency for base station 110 may be used in the local cell of the wide area cellular network where base station 110 is reinstalled. Consequently, at block 316 base station 110 determines if the telephone connection to the base station has been lost since the indication of the requested frequency was last received as described above. Base station 110 may further determine if the power connection to base station 110 has been lost since the indication of the requested frequency was last received. If the telephone connection or, alternatively, the telephone and power connections have been lost since the indication of the requested frequency was last received, base station 110 repeats steps 300 through 314 as described above. Alternatively, at step 316 when it has been determined that the connections have been lost base station 110 communications may be disabled until a new request for a selected frequency is initiated.

The above operations were described for an embodiment using the base station processor and keyboard to acquire the frequency information. In an alternative embodiment the keyboard and processor of cellular terminal 120 may be used to carry out the initialization operations. In this embodiment, all of the steps of FIG. 6 would be carried out while cellular terminal 120 was parked in base station 110. The communications with the wide area cellular network operator could then be handled by cellular terminal 120 with base station 110 serving to transmit signals between cellular terminal 120 and the network operator over PSTN 108.

It is preferred that base stations 110 not be allocated frequencies that are already in use in the cell of the wide area cellular network in which base station 110 is located, but to choose frequencies in use in the cell which is a maximum distance away. Allocation of frequency by the wide area cellular network provider in one embodiment is illustrated in FIG. 7. FIG. 7 illustrates a 21-cell frequency reuse pattern which is employed in some United States wide area cellular networks to avoid interference between neighboring cells. It is to be understood that a wide area cellular network 100 may include a plurality of such reuse patterns, and thus include greater than the 21 cells illustrated in FIG. 7. Each cell 104 in a cluster of 21 uses a different 1/21 fraction of the total number of frequencies available to the wide area cellular provider. FIG. 7 shows the distribution of 21 groups of frequencies numbered 1 to 21 in a regularly spaced cell lattice. It may be seen that the cells using the same frequency groups are equispaced and root(21) cell diameters between centers where cell diameter is defined as the diameter of the inscribed circle of each hexagon.

It may be seen in FIG. 7 that cells numbered 15 or 8 are those most distant from the cells numbered 1. Therefore, the frequencies that should be used for base stations 110 located within cells numbered 1 should be drawn from frequency groups 8 and 15. Reciprocally, the frequencies used for base stations 110 located in cells numbered 15 should be drawn from frequency groups 1 and 8 and so on for cells numbered 8. By symmetry, base stations 110 in cells numbered 2 should use frequencies drawn from groups 9 and 16 and so forth. Thus, base stations 110 within each region may employ 2/21 of the total number of frequencies available. If this contains at least 21 frequencies, then a 21-cell re-use plan can be employed to ensure that cells using the same frequency are at least root(21) cell diameters apart. This requires that the total number of frequencies employed in both the cell and cell systems is at least 21×21/2=220. This condition is normally satisfied in the U.S. AMPS system, where two competing operators share over 800 channels, having more than 400 each. Thus it is desirable that the cells should be capable of being programmed and reprogrammed to optimum frequencies from the mobile telephone network according to the cell in which they are located.

FIG. 8 illustrates how base frequency allocations may be made in the case of a cell re-use pattern such as the tighter, 7-cell pattern such as may be employed in the European GSM system. As shown in FIG. 8, within each cell, different areas are allocated different sets of frequencies for use by base stations 110 located within those subregions. In FIG. 8, the frequency allocation patterns for base stations 110 are illustrated for the cells numbered 1 and 5 respectively.

Figure 9:
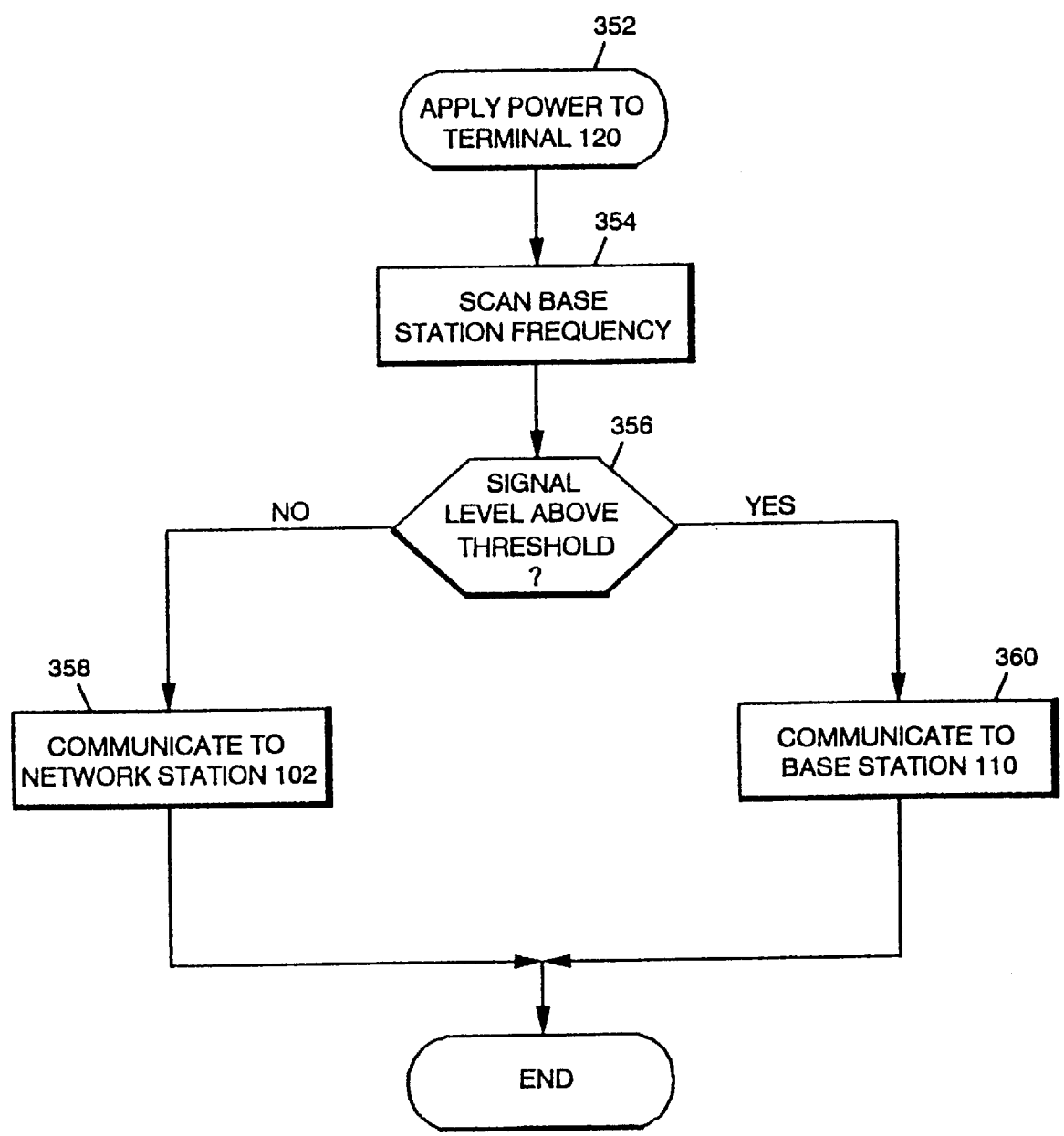
FIG. 9 is a flowchart illustrating operations of a radio personal communications system according to the present invention.

FIG. 9 illustrates a method for operation of the radio personal communications system once the frequency information has been acquired by base station 110 and its associated cellular terminal 120. Operations begin when power is applied to cellular terminal 120 at Block 352. Upon application of power, cellular terminal 120 scans the selected frequency allocated to its associated base station 110 at Block 354, and determines if a signal level above threshold has been detected, at Block 356. If a signal level above threshold has been detected, then terminal 120 is within the range 114 of its associated base station 110. Cellular terminal 120 then communicates at Block 360 over PSTN 108 by wireless communications to base station 110. If a signal level above threshold was not detected, then the terminal 120 is not within the range 114 of base station 110 and communications are initiated with network cell station 102 at Block 358, using conventional techniques.

It will be understood by those having skill in the art that a separate voice channel frequency and power level may be used for transmissions by base station 110 and terminal 120. The power levels may be different for the base station and the terminal if, for example, the base station has a larger antenna or a more sensitive receiver. It is also contemplated that the frequencies will be different since the terminal and base station would not typically transmit or receive on the same frequencies in a duplex transceiver. The base station and cellular terminal may alternatively employ time duplex on a single frequency, such as the 902 mHz "unlicensed band". Alternatively, a single frequency and power level may be obtained from the wide area cellular provider and a second frequency and power level may be determined from the single frequency and power level.

Accordingly, the network provider/operator may allocate frequencies and power levels of base station-to-terminal communications. By allocating the frequency and power level of base station-to-terminal communications, same frequency interference within a network cell is reduced and the network provider obtains additional revenue from the licensed frequency spectrum for the base station.

Figure 10A:
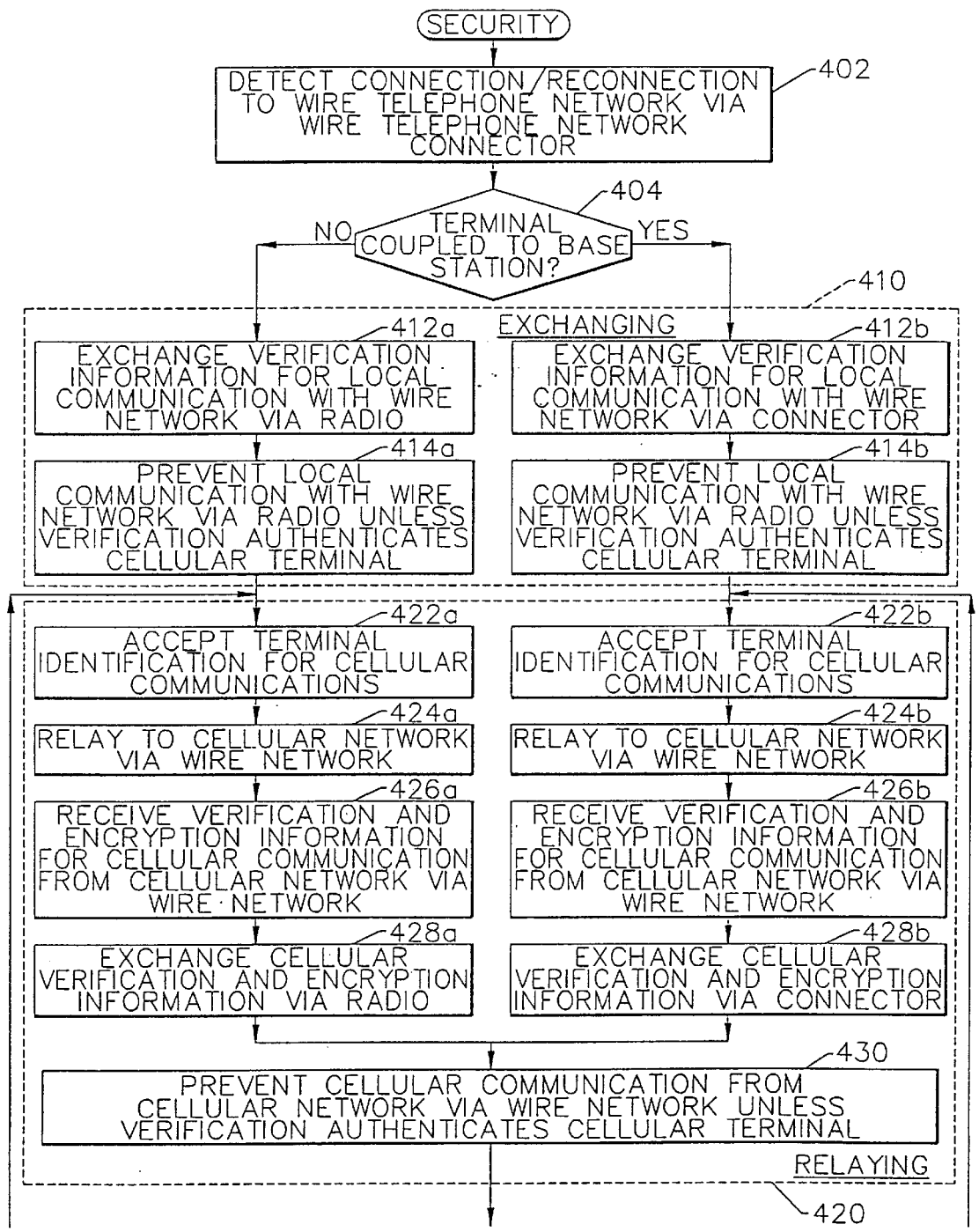
FIGS. 10A and 10B together form a flowchart illustrating security operations in a radio personal communications system according to the present invention.
Figure 10B:
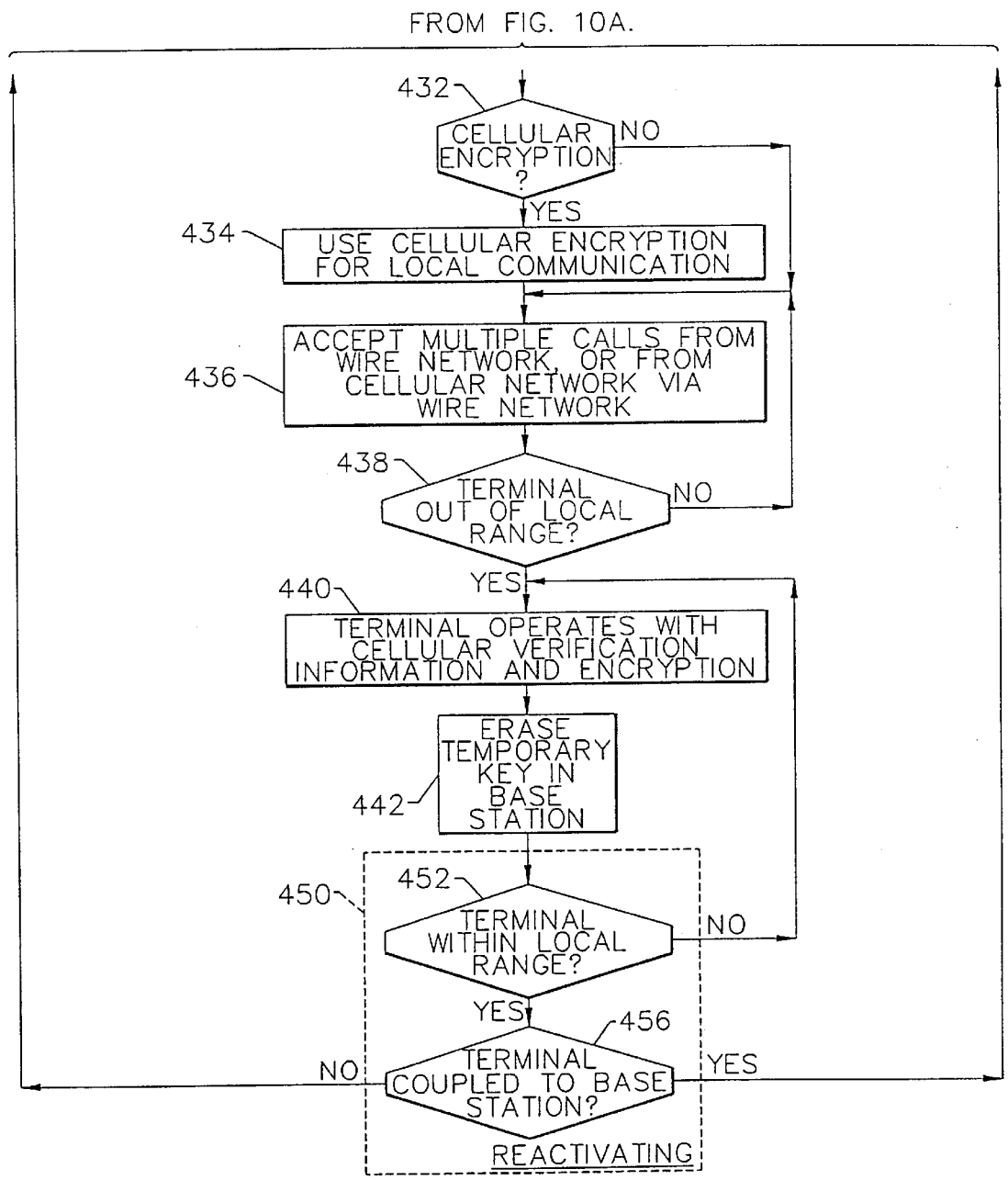

Referring now to FIGS. 10A and 10B, security operations in a radio personal communications system according to the present invention will now be described. It will be understood by those having skill in the art that these operations are preferably performed by stored program instructions in control processor 154 of FIG. 3. However, they may also be performed by stored program instructions in other components of FIG. 3, and may also be performed by special purpose hardware such as application specific integrated circuits (ASIC).

Referring to FIG. 10A at Block 402, connection or reconnection of the base station 110 to the wire telephone network (PSTN) 108 via wire telephone network connector 136 is detected by detector 152 of FIG. 3 to trigger security operations. A test is made at Block 404 as to whether the cellular terminal 120 is parked in base station 110. Similar exchanging operations 410 and relaying operations 420 are then performed, except that these operations are performed via transceiver 164 (FIG. 3) if the terminal is not coupled to base station 110 and are performed via connector 132 if the terminal is coupled to the base station. Preferably the operations are performed when parked so that radio frequency transmission of security information is avoided. However, when the cellular terminal reenters the local region of the base station, these operations may need to be performed via radio. Operations performed via transceiver 164 will be designated by the suffix "a" in FIG. 10A, while operations performed via connector 132 will be designated by the suffix "b" in FIG. 10A.

Still referring to FIG. 10A, an exchange of verification information for local communication with the wire network is performed at Blocks 412a and 412b. As used herein, "local communication" refers to communication between the base station and cellular terminal, within the local region, for wire network calls or cellular network calls. It will be understood by those having skill in the art that base station 110 and cellular terminal 120 may include verification and encryption protocols which govern local communications for wire network calls. In particular, the verification and encryption protocols are preferably the cellular network verification and encryption protocols so that duplication of protocols are not required. However, separate identification numbers and encryption keys may be used to govern local communications with the wire network. As shown in Blocks 414a and 414b, local communication with the wire network is prevented unless the exchange of verification information authenticates the cellular terminal. Accordingly, the operations of Blocks 412a, 412b and 414a, 414b, allow exchange of local telephone verification information with the cellular terminal for communications with the wire network when the cellular terminal is within the local region.

Still referring to FIG. 10A, operations 420 for relaying verification and encryption information between the wide area cellular network and the cellular terminal, via the base station and the wire network, will now be described. As shown in Blocks 422a, 422b, terminal identification for cellular communications is accepted. As known to those having skill in the art, a cellular phone typically includes an identification number which is unalterably stored in the cellular telephone. A similar arrangement is provided in cellular terminal 120. Cellular telephone protocol is used to communicate this identification to the base station. As shown in Blocks 424a, 424b, the terminal identification is relayed to the cellular network via the wire network. At Blocks 426a, 426b, verification and encryption information for cellular communication is received from the cellular network via the wire network after the preferred security exchanges discussed above. At Blocks 428a, 428b, cellular verification and encryption information is exchanged between the terminal and base station, under the direction of the wide area cellular area network via the wire network, using transceiver 164 or preferably via connector 132. As shown at Block 430, cellular communications from the cellular network via the wire network are prevented unless verification authenticates the cellular terminal.

Authenticating a cellular terminal's claimed ID by the security methods and systems of the present invention allows the base station to be used by visiting subscribers. The normal cellular network is specifically adapted to handle such "roamers", but the wireline network or PSTN does not allow visitors to make calls from another subscriber's phone with automatic transfer of the billing to the caller's phone. According to the invention, this feature is provided within the PSTN. A method and system which permit service of visiting cellular terminal to a non-native base station will now be described.

The visiting cellular terminal first identifies itself to the base station upon attempting to initiate a call. They then perform two operations, the order of which can be varied with greater or lesser security implications and operational impacts. The details are a matter of design choice.

Operation 1: The base station identifies the visiting cellular terminal's cellular service provider's service (800) number from a stored table and contacts it via the PSTN to obtain security variables. After the previously discussed security exchanges, the base station obtains a B-key from the service provider, but not necessarily in this case a frequency. The frequency used was already provided by the base station's registered service provider and remains so.

Operation 2: The base station switches to communicating with the visiting cellular terminal in encrypted mode to receive the desired number to be called, and then invokes an automatic billing transfer mechanism to place the call via the PSTN. The PSTN receives the visiting cellular terminal's telephone number and the desired number to be called. The onus is on the PSTN to verify the visiting cellular terminal's ID and accept or deny the call. The PSTN may for example deny the call simply if there is no commercial agreement for automatic billing transfer between the visited phone system and the visitor's service provider.

Referring now to FIG. 10B, assuming that the wide area cellular network has authenticated the cellular terminal, multiple local calls may be accepted and made via the wire network, or from the cellular network via the wire network, using the local verification information as shown at Block 436. If cellular encryption is used (Block 432), then cellular encryption is also used for the local communication.

Still referring to FIG. 10B, as shown at Block 438, multiple local calls continue as long as the terminal is within the local region. Once the terminal is outside the local region, then at Block 440, the terminal operates using the cellular verification information and encryption like a standard cellular telephone. The base station is not involved in these communications and may be deactivated until the terminal is again within the cordless range as shown at Block 452. For example, when the cellular network detects that the cellular terminal has been registered as active in another locality, a deactivating message may be sent to the base station. Reactivation operations 450 then take place. As part of deactivation, the temporary key in the base station is erased, at Block 442 so that upon reactivation, a new temporary key will be required before allowing communications with the cellular terminal via the base station. Optionally, the keys can be rotated for the next call.

In order to generate a cellular type radio signal which is comprehensible to a cellular terminal having a unique secret key which is electronically stored therein and is not possible to extract, the base station must be capable of encrypting and decrypting the enciphered messages. In order to avoid the base station from having to be programmed with or to receive the secret key from the wire telephone network, which can be a security hazard, the secret key is preferably transformed at call setup into a temporary key that is used only for that call or for a short time. If the temporary key is for any reason compromised, it only effects the security of that call and not the long term security of the secret key. Thus, the key received by the base station is preferably a temporary key rather than the permanent key which is stored in the cellular terminal.

Upon reactivation, a test is made at Block 456 as to whether the terminal is coupled to the base station, and relaying operations 420 begin again. The base station will automatically dial the mobile phone service node for appropriate reprogramming and then relay the dial digits to the wide area cellular network for effecting routing of the call. The wide area cellular network can then appropriately issue the authentication challenge to verify the terminal's identity and establish a new temporary encryption key in both the terminal and the base station. When the base station is activated due to the cellular system having accepted registration of the cellular terminal in the local area, then any reauthentication performed over the cellular network resulting in a new temporary key should preferably be copied to the base station so that calls received on the home number and converted to cellular signals can be correctly encrypted and decrypted. It will be understood by those having skill in the art that the exchanging operations 410 may also be performed again although preferably they are not performed again until the wire network connection is lost, indicating that the base station has been moved.

Accordingly, the present invention allows the base station which is connected to the wire telephone network, to handle the caller identification and verification methodology which is employed by the cellular system to prevent telephone fraud. The cellular system communicates to the base station over the wide area network, for example using a predefined cellular network service number. The cellular terminal is thereby linked to the wide area cellular network, via the base station and wire network, preferably while the cellular terminal is physically parked in the base station. The terminal key or a temporary terminal key is thereby made available. The base station preferably converts the handshake from the cellular terminal to wire telephone network line signals rather than direct radio transmissions from the terminal to the wide area cellular network. These operations can be performed on system activation or reactivation at the same time as frequency allocation occurs.

As described, the base station and terminal can also have their own encryption key for use in linking between the two for local communications with the wire telephone network. Thus, antifraud protection may be provided when the terminal is acting simply as a local phone linked by the base station to the wire network, without requiring interface with the wide area cellular provider.

As also described, the base station also can handle the encryption methodology that is used by the cellular system. Preferably, a new temporary key is not obtained by the base station for each call. Rather, the temporary key is assigned on system activation and is used for all subsequent communications between the base station and the terminal until reactivation is required. Optionally, the base station and terminal can have their own key for use in linking between the two, which is assigned and shared between the base station and the terminal when the terminal is physically plugged into the base station.

It is also to be understood that the present invention may be used within any cellular type wireless communications structure where a cellular type structure is understood to encompass any system incorporating any type of channel reuse pattern over a wide area communications network.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A telephone base station for connecting a wire telephone network to a cellular terminal within a local region of a wide area cellular network, said telephone base station comprising:

wire telephone network connecting means, for connecting said base station to said wire telephone network;

means for relaying cellular verification signals between said wide area cellular network and a cellular terminal, via said wire telephone network connecting means; and detecting means, electrically connected to said wire telephone network connecting means, for detecting if the electrical connection between said wire telephone network and said wire telephone network connecting means has been lost;

wherein said relaying means is responsive to said detecting means for preventing radiotelephone communication between said cellular terminal and said base station via said wire telephone network connecting means, after loss of the electrical connection to said wire telephone network, unless said relaying means again relays cellular verification signals between said wide area cellular network and said cellular terminal, via said wire telephone network connecting means.

2. The telephone base station of claim 1 further comprising:

coupling means, electrically connected to said relaying means, and adapted to cooperatively mate with a cellular terminal so that an electrical connection is provided between the cellular terminal and the base station when the cellular terminal is parked in the telephone base station, for coupling said cellular verification signals between said cellular terminal and said relaying means through the electrical connection when the cellular terminal is parked in the telephone base station.

3. The telephone base station of claim 2 wherein said relaying means further relays cellular encryption signals between said wide area cellular network and said cellular terminal, via said wire telephone network connecting means.

4. The telephone base station of claim 1 further comprising:

radio transceiving means, electrically connected to said relaying means, for coupling said cellular verification signals between said cellular terminal and said relaying means.

5. The telephone base station of claim 4 wherein said relaying means further relays cellular encryption signals between said wide area cellular network and said cellular terminal, via said radio transceiving means.

6. The telephone base station of claim 1 further comprising:

means for exchanging local telephone verification signals with said cellular terminal, for communications therewith when said cellular terminal is within said local region.

7. The telephone base station of claim 6 further comprising:

coupling means, electrically connected to said exchanging means, and adapted to cooperatively mate with a cellular terminal so that an electrical connection is provided between the cellular terminal and the base station when the cellular terminal is parked in the telephone base station, for coupling said local telephone verification signals for verifying the cellular terminal between said cellular terminal and said exchanging means through the electrical connection when the cellular terminal is parked in the telephone base station.

8. The telephone base station of claim 6 further comprising:

radio transceiving means, electrically connected to said exchanging means, for coupling said local telephone verification signals between said cellular terminal and said exchanging means.

9. The telephone base station of claim 6 wherein said exchanging means further comprises means for preventing radiotelephone communication between said cellular terminal and said wire telephone network via said wire telephone network connecting means unless the exchanged local verification signals indicate that said radiotelephone communication is authorized.

10. The telephone base station of claim 9 wherein said preventing means comprises means for decrypting the called number.

11. The telephone base station of claim 1 further comprising means for receiving cellular encryption keys from said cellular network via said wire telephone network connecting means.

12. The telephone base station of claim 8 further comprising means for exchanging encryption signals with said cellular terminal, via said radio transceiving means.

13. The telephone base station of claim 1 wherein said cellular verification signals include a temporary key which is stored in said base station.

14. The telephone base station of claim 13 wherein said relaying means further comprises means for preventing radiotelephone communication between said cellular terminal and said wide area cellular network via said wire telephone network connecting means unless the relayed cellular verification signals indicate that said radiotelephone communication is authorized.

15. The telephone base station of claim 14 wherein said preventing means comprises means for decrypting the called number.

16. The telephone base station of claim 13 further comprising:
    power line connecting means; and
    battery charging means electrically connected to said power line connecting means, for charging a battery in a cellular terminal which is cooperatively mated thereto.

17. The telephone base station of claim 13 further comprising means for detecting that said cellular terminal is outside said local region, and for erasing a previously used temporary key from said base station in response thereto.

18. The telephone base station of claim 13 further comprising means for detecting that the cellular terminal is outside said local region and for rotating the use of said temporary keys in response thereto.

19. A security method for a telephone base station which connects a wire telephone network to a cellular terminal within a local region of a wide area cellular network, said security method comprising the following steps which are performed by the telephone base station:
    detecting if the electrical connection between the wire telephone network and the base station has been lost; and
    relaying cellular verification signals between the wide area cellular network and a cellular terminal, via the wire telephone network wherein said relaying step is preceded by said detecting step and wherein said relaying step further comprises the step of preventing radiotelephone communication between the cellular terminal and the base station after loss of the electrical connection to said wire telephone network until again relaying cellular verification signals between the wide area cellular network and the cellular terminal, via the wire telephone network.

20. The security method of claim 19 wherein said relaying step comprises the step of relaying the cellular verification signals for verifying the cellular terminal between the wide area cellular network and the cellular terminal through an electrical connection provided between the cellular terminal and the base station when the cellular terminal is parked in the base station.

21. The security method of claim 20 wherein said relaying step further comprises the step of relaying cellular encryption signals between the wide area cellular network and the cellular terminal, when the cellular terminal is parked in the base station.

22. The security method of claim 19 wherein said relaying step comprises the step of relaying cellular verification signals between the wide area cellular network and the cellular terminal via radio transmission, when the cellular terminal is within the local region.

23. The security method of claim 22 wherein said relaying step further comprises the step of relaying encryption signals between the wide area cellular network and the cellular terminal, via radio, when the cellular terminal is within the local region.

24. The security method of claim 19 further comprising the following step which is performed by the telephone base station step:
    exchanging local telephone verification signals with the cellular terminal, for communications therewith when said cellular terminal is within said local region.

25. The security method of claim 24 wherein said exchanging step comprises the step of exchanging the local telephone verification signals for verifying the cellular terminal between the wide area cellular network and the cellular terminal through an electrical connection provided between the cellular terminal and the base station when the cellular terminal is parked in the base station.

26. The security method of claim 25 wherein said exchanging step further comprises the step of exchanging cellular encryption signals with the cellular terminal, when the cellular terminal is parked in the base station.

27. The security method of claim 24 wherein said exchanging step comprises the step of exchanging the local telephone verification signals between the wide area cellular network and the cellular terminal via radio transmission, when the cellular terminal is within the local region.

28. The security method of claim 27 wherein said exchanging step further comprises the step of exchanging cellular encryption signals with the cellular terminal, via radio, when the cellular terminal is within the local region.

29. The security method of claim 24 further comprising the following step which is performed by the telephone base station:
    preventing radiotelephone communication between said cellular terminal and said wire telephone network via the base station, unless the exchanged local verification signals indicate that said radiotelephone communication is authorized.

30. The security method of claim 29 wherein the cellular verification signals include a temporary key which is stored in said base station.

31. The security method of claim 27 further comprising the following step which is performed by the telephone base station:
    preventing radiotelephone communication between said cellular terminal and said wire telephone network via the base station, unless the relayed cellular verification signals indicate that said radiotelephone communication is authorized.

32. The security method of claim 31 wherein said preventing step comprises the step of encrypting and decrypting the called number.

33. The security method of claim 30 further comprising the following steps which are performed by the base station:
    detecting that the cellular terminal is outside said local region; and
    erasing said temporary key in response thereto.

34. The security method of claim 30 wherein said relaying step is preceded by the following step which is performed by the base station:
    detecting reentry of the cellular terminal into the local region.

35. The telephone base station of claim 1 further comprising means for receiving a frequency indicating signal from said wide area cellular network.

36. The telephone base station of claim 35 wherein said frequency indicating signal receiving means comprises means for receiving said frequency indicating signal only if said cellular verification signals are accepted by said cellular network.

37. A telephone base station for connecting a wire telephone network to a cellular terminal within a local region of a wide area cellular network, said telephone base station comprising:

wire telephone network connecting means, for connecting said base station to said wire telephone network;

means for relaying cellular verification signals between said wide area cellular network and a cellular terminal, via said wire telephone network connecting means;

means for exchanging local telephone verification signals with said cellular terminal, for communications therewith when said cellular terminal is within said local region; and detecting means, electrically connected to said wire telephone network connecting means, for detecting if the electrical connection between said wire telephone network and said wire telephone network connecting means has been lost;

wherein said exchanging means is responsive to said detecting means for preventing radiotelephone communication between said cellular terminal and said base station, after loss of the electrical connection to said wire telephone network, unless said exchanging means again exchanges local verification signals with said cellular terminal.

38. A security method for a telephone base station which connects a wire telephone network to a cellular terminal within a local region of a wide area cellular network, said security method comprising the following steps which are performed by the telephone base station:

relaying cellular verification signals between the wide area cellular network and a cellular terminal, via the wire telephone network;

detecting if the electrical connection between the wire telephone network and the base station has been lost; and exchanging local telephone verification signals with the cellular terminal, for communications therewith when said cellular terminal is within said local region wherein said exchanging step is preceded by said detecting step wherein said exchanging step further comprises the step of preventing radiotelephone communication between the cellular terminal and the base station, after loss of the electrical connection to said wire telephone network, until again exchanging local verification signals with the cellular terminal.

39. The security method of claim 29 wherein said preventing step comprises the step of encrypting and decrypting the called number.

40. The telephone base station of claim 35 further comprising reactivation detecting means, for detecting reentry of said cellular terminal into said local region, said relaying means being further responsive to said reactivation detecting means.

41. The telephone base station of claim 35 further comprising telephone connecting means, for connecting said base station to a wire telephone.

* * * * *

UNITED STATES PATENT AND TRADEMARK OFFICE
CERTIFICATE OF CORRECTION

PATENT NO. : 5,812,955
DATED : September 22, 1998
INVENTOR(S) : Dent, et al.

It is certified that error appears in the above-identified patent and that said Letters Patent is hereby corrected as shown below:

On the title page:
The following references should be added:

U.S. PATENT DOCUMENTS

| | | | |
|---|---|---|---|
| 4,790,000 | 12/88 | Kinoshita | 379/59 |
| 4,748,655 | 5/88 | Thrower, et al. | 379/60 |
| 5,241,598 | 8/93 | Raith | 380/21 |
| 5,357,561 | 10/94 | Grube | 379/60 |

Signed and Sealed this

Twenty-eighth Day of December, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,812,955
DATED : September 22, 1998
INVENTOR(S) : Dent, et al.

It is certified that error appears in the above-identified patent and that said Letters Patent is hereby corrected as shown below:

ON THE COVER SHEET:
The following references should be added:

U.S. PATENT DOCUMENTS

| | | | |
|---|---|---|---|
| 4,284,848 | 8/81 | Frost | 455/11.1 |
| 4,528,656 | 7/85 | Morais | 379/58 |
| 4,731,840 | 3/88 | Miniszewski, et al; | 380/21 |
| 4,972,460 | 11/90 | Sasuta | 379/60 |
| 5,133,001 | 7/92 | Bohm | 379/58 |
| 5,179,721 | 1/93 | Comroe, et al; | 455/33.1 |
| 5,193,101 | 3/93 | McDonald | 455/33.1 |
| 5,265,150 | 11/93 | Helmkamp, et al; | 379/58 |
| 5,327,573 | 7/94 | Lenchik, et al; | 455/14 |
| 5,384,826 | 1/95 | Amitay | 379/60 |
| 5,428,668 | 6/95 | Dent, et al; | 379/59 |
| 5,442,681 | 8/95 | Kotzin, et al; | 379/59 |
| 5,448,623 | 9/95 | Wiedeman, et al; | 379/59 |

FOREIGN PATENT DOCUMENTS

| | | |
|---|---|---|
| 002,234,649 | 2/91 | United Kingdom |
| 000,479,477 | 4/92 | European |
| 092,008,324 | 5/92 | PCT |
| 002,250,665 | 6/92 | United Kingdom |
| 000,536,921 | 4/93 | European |
| 093,011,646 | 6/93 | PCT |
| 002,268,857 | 1/94 | United Kingdom |

Signed and Sealed this

Twelfth Day of December, 2000

Attest:

Q. TODD DICKINSON

Attesting Officer     Director of Patents and Trademarks